(12) United States Patent
Zhou et al.

(10) Patent No.: US 11,893,236 B2
(45) Date of Patent: Feb. 6, 2024

(54) INTERFACE DISPLAY METHOD AND APPARATUS OF APPLICATION, DEVICE, AND MEDIUM

(71) Applicant: Tencent Technology (Shenzhen) Company Limited, Shenzhen (CN)

(72) Inventors: Hao Zhou, Shenzhen (CN); Zhe Feng, Shenzhen (CN); Yuxuan Zhang, Shenzhen (CN); Xiaosi Lai, Shenzhen (CN); Xiangyi Feng, Shenzhen (CN); Jiayi Ding, Shenzhen (CN); Tao Huang, Shenzhen (CN); Ge Wang, Shenzhen (CN); Chuangmu Yao, Shenzhen (CN); Yixiang Fang, Shenzhen (CN); Haitao Chen, Shenzhen (CN); Jiashuai Shi, Shenzhen (CN); Meng Zhao, Shenzhen (CN); Qiang Yan, Shenzhen (CN); Jianxiong Feng, Shenzhen (CN); Cong Jiang, Shenzhen (CN); Jiamin Chen, Shenzhen (CN); Tianyi Liang, Shenzhen (CN); Hongfa Qiu, Shenzhen (CN); Huawei Zhang, Shenzhen (CN); Heyi Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/071,475

(22) Filed: Nov. 29, 2022

(65) Prior Publication Data
US 2023/0091262 A1 Mar. 23, 2023

Related U.S. Application Data

(63) Continuation of application No. PCT/CN2021/115398, filed on Aug. 30, 2021.

(30) Foreign Application Priority Data

Sep. 9, 2020 (CN) .......................... 202010943699.0

(51) Int. Cl.
G06F 3/04886 (2022.01)
G06F 3/0481 (2022.01)
G06F 3/04842 (2022.01)

(52) U.S. Cl.
CPC ........ *G06F 3/04886* (2013.01); *G06F 3/0481* (2013.01); *G06F 3/04842* (2013.01)

(58) Field of Classification Search
CPC .. G06F 3/0481; G06F 3/0482; G06F 3/04883; G06F 3/04842; G06F 3/04886; G06F 3/04895
See application file for complete search history.

(56) References Cited

U.S. PATENT DOCUMENTS

2009/0327976 A1* 12/2009 Williamson .......... G06F 3/0488
715/863
2012/0019446 A1* 1/2012 Wu ....................... G06F 3/0237
345/173

(Continued)

FOREIGN PATENT DOCUMENTS

| CN | 101231636 A | 7/2008 |
| CN | 101673186 A | 3/2010 |

(Continued)

OTHER PUBLICATIONS

Ming Xue Wang et al., Enterprise search with development for network management system, Jun. 1, 2015, IEEE Computer Society, pp. 430-437 (Year: 2015).*

(Continued)

*Primary Examiner* — Tam T Tran
(74) *Attorney, Agent, or Firm* — Morgan, Lewis & Bockius LLP

(57) ABSTRACT

This application discloses a method of displaying information in a program interface of an application performed by (Continued)

a computer device. The method includes: displaying a virtual keyboard control and an extension bar control in the program interface; in response to an input operation in the virtual keyboard control, displaying at least one character string in the extension bar control, the at least one character string being determined according to the input operation in the virtual keyboard control; and in response to a select operation on a target string among the at least one character string in the extension bar control, displaying a function interface of applying a target function to the target string. This embodiment allows a user to quickly switch between function interfaces when using an application, thereby reducing operation steps of the user and improving human-computer interaction efficiency.

18 Claims, 12 Drawing Sheets

(56) References Cited

U.S. PATENT DOCUMENTS

| | | | |
|---|---|---|---|
| 2014/0164981 | A1 | 6/2014 | Colley et al. |
| 2015/0100537 | A1* | 4/2015 | Grieves .................. G06N 5/02 706/52 |
| 2015/0161246 | A1* | 6/2015 | Liu ....................... G06F 3/0237 707/722 |
| 2020/0257377 | A1* | 8/2020 | Lee ....................... G06F 40/274 |

FOREIGN PATENT DOCUMENTS

| | | |
|---|---|---|
| CN | 101782833 A | 7/2010 |
| CN | 102314439 A | 1/2012 |
| CN | 102866785 A | 1/2013 |
| CN | 105511797 A | 4/2016 |
| CN | 107273457 A | 10/2017 |
| CN | 112068762 A | 12/2020 |

OTHER PUBLICATIONS

Santosh Pattar et al., Searching for the IoT Resources: Fundamentals, Requirements, Comprehensive Review, and Future Directions, Jul. 1, 2018, IEEE Communications Surveys & Tutorials, vol. 20, No. 3, pp. 2101-2132 (Year: 2018).*

Tencent Technology, ISR, PCT/CN2021/115398, Nov. 17, 2021, 3 pgs.

Tencent Technology, WO, PCT/CN2021/115398, Nov. 17, 2021, 6 pgs.

Tencent Technology, IPRP, PCT/CN2021/115398, Mar. 7, 2023, 7 pgs.

* cited by examiner

INTERFACE DISPLAY METHOD AND APPARATUS OF APPLICATION, DEVICE, AND MEDIUM

CROSS-REFERENCE TO RELATED APPLICATIONS

This application is a continuation application of PCT Patent Application No. PCT/CN2021/115398, entitled "INTERFACE DISPLAY METHOD AND APPARATUS FOR APPLICATION PROGRAM, DEVICE AND MEDIUM" filed on Aug. 30, 2021, which claims priority to Chinese Patent Application No. 202010943699.0, filed with the State Intellectual Property Office of the People's Republic of China on Sep. 9, 2020, and entitled "INTERFACE DISPLAY METHOD AND APPARATUS OF APPLICATION, DEVICE, AND MEDIUM", all of which are incorporated herein by reference in their entirety.

FIELD OF THE TECHNOLOGY

This application relates to the field of man-machine interaction, and in particular, to an interface display method and apparatus of an application, a device, and a medium.

BACKGROUND OF THE DISCLOSURE

An application is a computer application run in an operating system to complete a specified task. One application can include a plurality of functions.

To use a function in an application, a user needs to find a function portal of the function in the application, switch from the function portal to a function interface of the function, and use the function in the function interface. For example, to use a search function in the application, the user needs to exit a currently used function interface, find a function portal of the search function, and then switch to a function interface of the search function through a trigger operation.

SUMMARY

Embodiments of this application provide an interface display method and apparatus of an application, a device, and a medium, which can quickly switch between function interfaces, thereby reducing operation steps of the user and improving human-computer interaction efficiency.

According to one aspect of this application, a method of displaying information in a program interface of an application is performed by a computer device, the method including:
  displaying a virtual keyboard control and an extension bar control in the program interface;
  in response to an input operation in the virtual keyboard control, displaying at least one character string in the extension bar control, the at least one character string being determined according to the input operation in the virtual keyboard control; and
  in response to a select operation on a target string among the at least one character string in the extension bar control, displaying a function interface of applying a target function to the target string.

According to another aspect of this application, an interface display apparatus of an application is provided, including:
  an interface display module, configured to display a program interface of the application; and
  a control display module, configured to display a virtual keyboard control and an extension bar control in the program interface, and in response to an input operation in the virtual keyboard control, display at least one character string in the extension bar control, the at least one character string being determined according to the input operation in the virtual keyboard control;
  the interface display module being further configured to, in response to a select operation on a target string among the at least one character string in the extension bar control, display a function interface of applying a target function to the target string.

In an embodiment of this application, the control display module is further configured to display at least one of an input string or a predictive string in the extension bar control, the input string being a character string inputted by the input operation, and the predictive string being a character string obtained through word prediction based on the input string.

In an embodiment of this application, the control display module is further configured to determine at least one of a first predictive string or a second predictive string according to the input string, the first predictive string being determined in a local word prediction database of the application, and the second predictive string being determined in an online word prediction database in a server.

In an embodiment of this application, the extension bar control further displays a name string of a search function of the application; and
  the interface display module is further configured to display a main interface or a search result interface of the search function in response to a fourth trigger operation on the name string.

In an embodiment of this application, the apparatus further includes:
  an application listening module, configured to listen for an input event of an operating system through the application, the input event being generated by the operating system after the input method program collects the input string; and
  a string extraction module, configured to extract the input string from the input event through the application.

In an embodiment of this application, a lower edge of the extension bar control is connected to an upper edge of the virtual keyboard control; and
  the control display module is further configured to change a display location of the extension bar control with a control height of the virtual keyboard control when the control height of the virtual keyboard control changes, and maintain the lower edge of the extension bar control connected to the upper edge of the virtual keyboard control;
  the control height being a height between a lower edge and the upper edge of the virtual keyboard control.

In an embodiment of this application, the control display module is further configured to update a display location of the extension bar control with a keyboard height of a second keyboard layout when the virtual keyboard control changes from a first keyboard layout to the second keyboard layout and a keyboard height of the first keyboard layout is different from the keyboard height of the second keyboard layout;
  the first keyboard layout and the second keyboard layout being different keyboard layouts of a same input method program, or the first keyboard layout and the second keyboard layout being keyboard layouts of different input method programs.

In an embodiment of this application, the control display module is further configured to cancel the display of the extension bar control in response to a cancel operation in the program interface; or in response to a delete operation in the virtual keyboard control, cancel the display of the extension bar control when the input string is deleted.

In an embodiment of this application, the control display module is further configured to delete some characters in the input string in response to a delete operation in the virtual keyboard control to obtain an input string after the deletion; determine one or more predictive strings corresponding to the input string after the deletion; and cancel the display of the extension bar control when the number of the one or more predictive strings is less than a second preset number.

According to another aspect of this application, a computer device is provided. The computer device includes a processor and a memory, the memory stores at least one program, and the at least one program is loaded and executed by the processor and causing the computer device to implement the interface display method of an application according to the foregoing aspects.

According to another aspect of this application, a non-transitory computer-readable storage medium is provided. The computer storage medium stores at least one program, and the at least one program is loaded and executed by a processor of a computer device and causes the computer device to implement the interface display method of an application according to the foregoing aspects.

The technical solutions provided in the embodiments of this application have at least the following beneficial effects:

An extension bar control attached to a virtual keyboard control is provided in a program interface of an application running in a foreground, and at least one character string is displayed in the extension bar control, allowing the application running in the foreground to quickly provide a function portal of a target function required by a user, so that the user can quickly switch between function interfaces during use, and especially can switch to a function interface of the target function in case of a hidden function portal of the target function or a deeper level of interaction, thereby reducing operation steps of the user and improving human-computer interaction efficiency.

BRIEF DESCRIPTION OF THE DRAWINGS

To describe technical solutions in embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make objectives, technical solutions, and advantages of this application clearer, the following further describes in detail implementations of this application with reference to the accompanying drawings.

First terms involved in the embodiments of this application are introduced as follows:

A user interface (UI) is a graphical state presented in front of a user on a display screen and is briefly referred to as an interface.

A control is encapsulation of data and a method. The control is a basic element constituting the UI.

A character string is a character combination including at least one of numbers, letters, or special characters and is a data type of text in a programming language.

Figure 1:
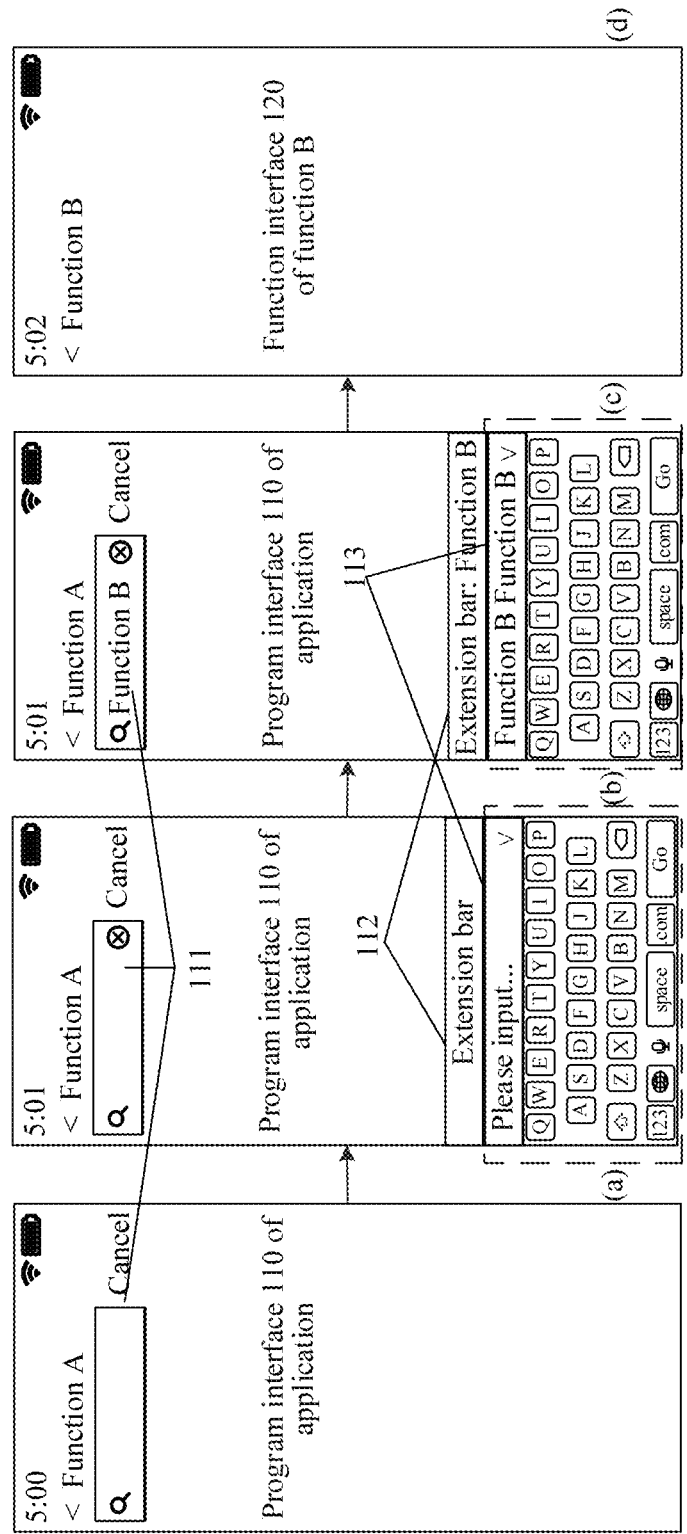
FIG. 1 is a schematic diagram of interface changes of an application according to an exemplary embodiment of this application.

An embodiment of this application provides an extension bar control. The extension bar control is displayed following a virtual keyboard control, and displays at least one character string according to an input operation on the virtual keyboard control. When a character string on the extension bar control is tapped, a target function is quickly triggered according to the character string. The target function is a function provided by a current application or by another application. For example, as shown in FIG. 1, a program interface 110 of an application running in a foreground is shown in (a) in FIG. 1. The program interface 110 is a function interface of a function A of the application. A search box control 111 is provided in an upper part of the program interface 110.

After a user taps the search box control 111, as shown in (b) in FIG. 1, an extension bar control 112 and a virtual keyboard control 113 appear in the program interface 110. Optionally, the virtual keyboard control 113 is displayed in a lower area of the program interface 110, a lower edge of the extension bar control 112 is fixedly connected to an upper edge of the virtual keyboard control 113, and a control width of the extension bar control 112 is the same as that of the virtual keyboard control 113.

After the user performs an input operation in the virtual keyboard control 113, as shown in (c) in FIG. 1, an input string of "功能B" (function B) is displayed in the search box control 111, and an input string of "功能B" and a predictive string such as "功能B的二维码" (two-dimensional code of function B) are displayed in the extension bar control 112.

After the user taps the character string of "功能B" in the extension bar control 112, as shown in (d) in FIG. 1, a terminal switches from the program interface 110 of the application to display of a function interface 120 of the function B. For example, the function B is a local search function or a network-wide search function in the application. Optionally, the function A and the function B may be provided by the same application or may be provided by different applications.

In an application in the related art, a user can implement switching from a current function interface to another function interface only after finding a function portal of a function through a plurality of human-computer interaction operations. Especially in case of a hidden function portal of the function or a deeper level of interaction, the user needs to use more human-computer interaction operations to find the function portal. This embodiment of this application provides an extension bar control attached to a virtual keyboard control to implement quick switching between function interfaces.

Figure 2:
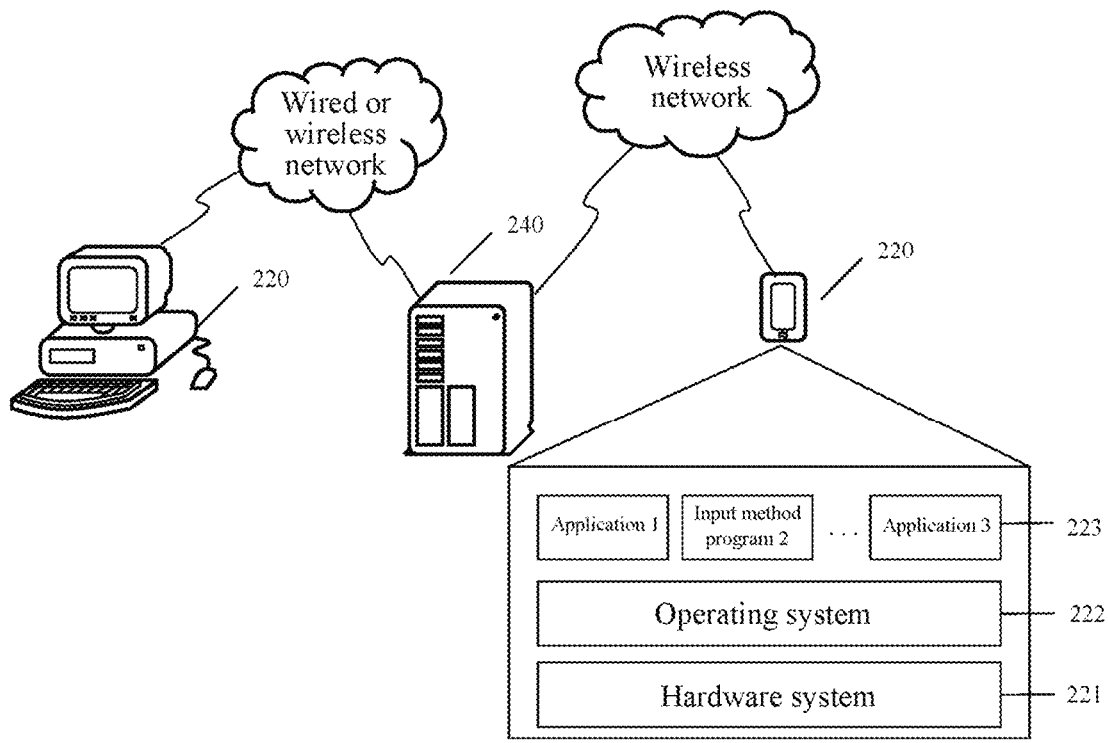
FIG. 2 is a block diagram of a computer system according to an exemplary embodiment of this application.

FIG. 2 is a block diagram of a computer system according to an exemplary embodiment of this application. The computer system 200 includes a terminal 220 and a server 240.

The terminal 220 is a mobile phone, a tablet computer, an e-book reader, a laptop, a desktop computer, or the like. The terminal 220 includes a hardware system 221, an operating system 222, and an application layer 223. The hardware system 221 is a physical device that constitutes the terminal. For example, the hardware system 221 is an entity component with a calculation function, a control function, a storage function, or an input/output function, such as a central processing unit (CPU) or a memory. The operating system 222 is a computer program that manages hardware and software resources, and provides an operation interface for interaction between a user and the system. The application layer 223 provides the user with applications, including at least an application 1 and an input method program 2. The application 1 includes at least a function of listening for content inputted by the input method program 2 into the application 1. The input method program 2 is an encoding method used for inputting various symbols into an electronic device. For example, the application layer 223 further includes another application, such as an application 3. The application 1 has one or more functions. A control for inputting text content is provided in at least one program interface of the application 1. The application 1 is any type of program, such as an instant messaging program or a text editing program.

The terminal 220 is connected to the server 240 by using a wired network or wireless network. There may be one or more terminals 220.

The server 240 may be any one of a server, a server cluster, a virtual cloud storage, or a cloud computing center. The server 240 is configured to provide the application 1 with background services, such as a word prediction service and a search service. The server 240 has a data storage capability.

Figure 3:
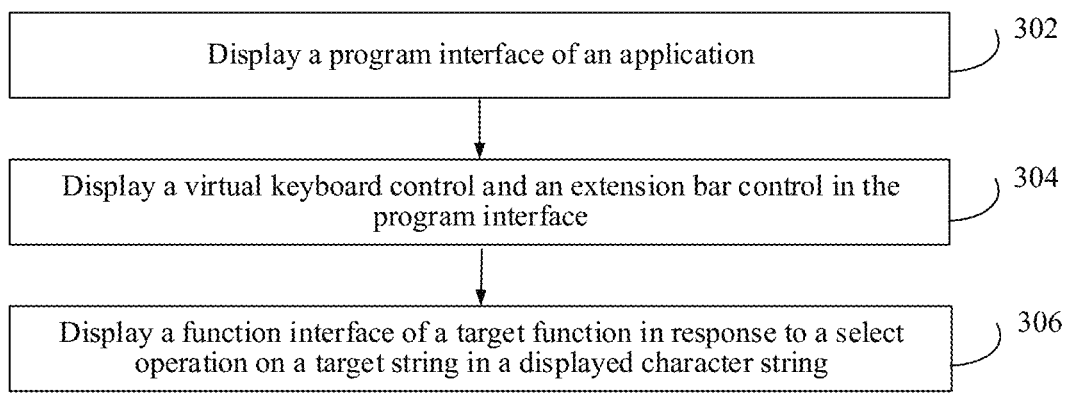
FIG. 3 is a flowchart of an interface display method of an application according to an exemplary embodiment of this application.

FIG. 3 is a flowchart of an interface display method of an application according to an exemplary embodiment of this application. This embodiment is described by using an example in which the method is applied to the terminal 220 shown in FIG. 2. The method may be performed by an application in the terminal 220. The method includes the following steps.

Step 302: Display a program interface of an application.

There are a plurality of applications in the same terminal. A user can open any application for an operation. For example, the program interface is provided by an application running in a foreground.

The application includes one or more functions. For example, the one or more functions include, but are not limited to at least one of: an address book, a text chat, a voice chat, a memo, an SMS message, an email, a navigation, an album, a calendar, search, an alarm clock, a weather report, audio playback, video playback, or text editing.

The program interface is a UI in the application, such as a home UI, a UI of a particular function, or a UI that provides at least two functions at the same time. For example, there is a text input control in the program interface. The text input control includes, but is not limited to at least one of: an input box control, a search box control, a text editing control, a chart control, an image processing control, or a document processing control.

For example, when the application running in the foreground is the application 1, the program interface may be a program interface of the application 1 opened by a user a. The program interface of the application is a function interface of a function A in the application 1.

Step 304: Display a virtual keyboard control and an extension bar control in the program interface.

The extension bar control displays at least one character string. The at least one character string is determined according to an input operation in the virtual keyboard control. The virtual keyboard control is a control provided by an input method program. The extension bar control is a control provided by the application.

The at least one character string is determined according to the input operation in the virtual keyboard control. Alternatively, the at least one character string is determined according to an input string inputted by the input operation in the program interface.

For example, the at least one character string includes at least one of an input string or a predictive string. The input string is a character string inputted by the input operation triggered in the virtual keyboard control. The predictive string is a character string obtained through word prediction based on the input string.

The virtual keyboard control is a control provided by the input method program. The virtual keyboard control is a control for inputting text content. The virtual keyboard control includes, but is not limited to: at least one of a 26-key English letter keyboard, a 26-key Chinese letter keyboard, a 9-key Chinese letter keyboard, a handwriting input keyboard control, a speech-to-text input keyboard control, a Japanese keyboard, a Korean keyboard, a Russian keyboard, or other minority-language input keyboards. A type of the virtual keyboard control is not limited in this embodiment of this application.

Figure 4:
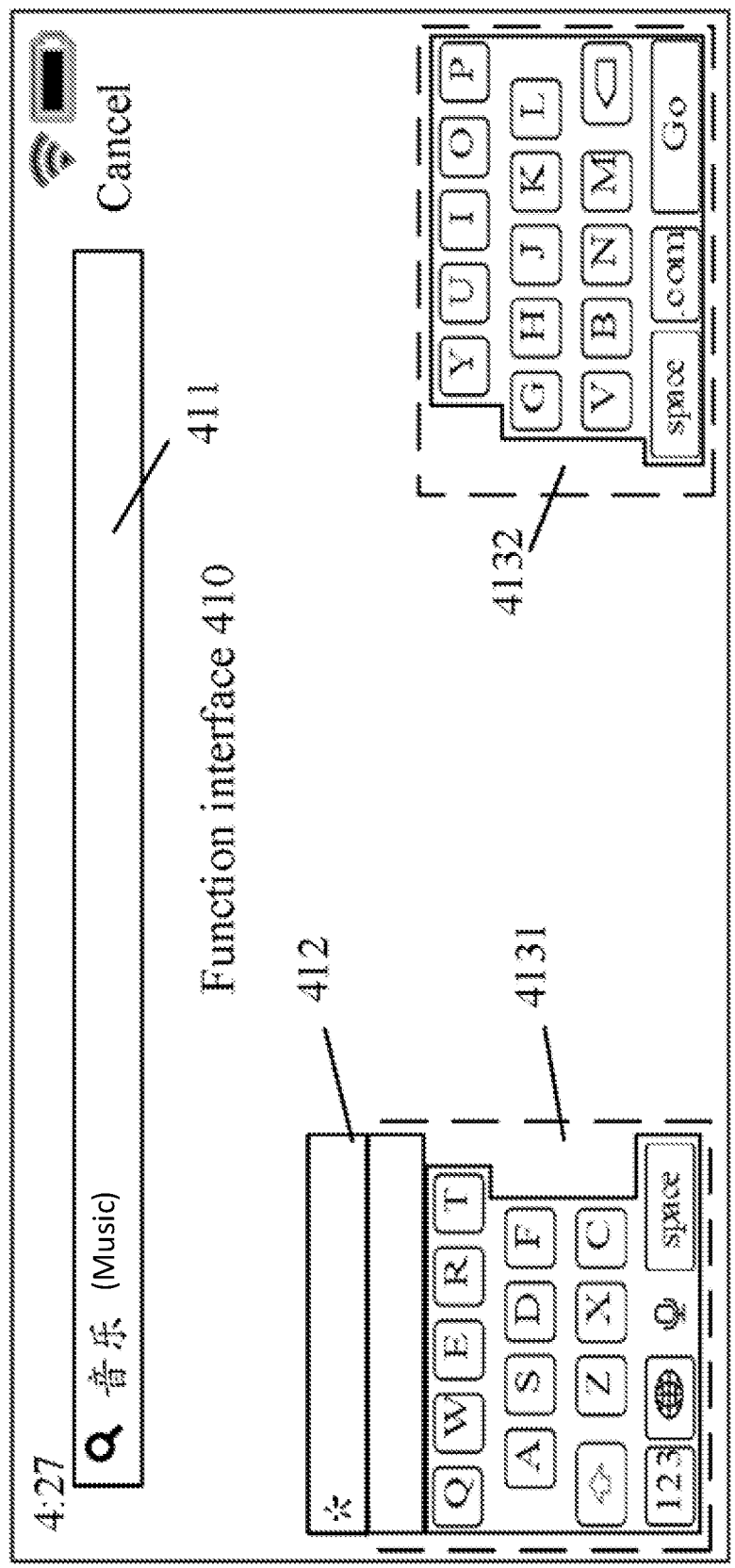
FIG. 4 is a diagram of interface changes of an application according to an exemplary embodiment of this application.

For example, the virtual keyboard control is displayed in a lower area of the program interface. The lower area is an area close to a lower edge in landscape or portrait display. For example, the virtual keyboard control is displayed in at least one of a left area or a right area of the program interface. The left area is an area close to a left edge in landscape or portrait display. The right area is a half area close to a right edge in landscape or portrait display. As shown in FIG. 4, the virtual keyboard control includes a left keyboard control 4131 and a right keyboard control 4132. The half area in this embodiment of this application is merely a half area in an approximate sense, and does not refer to a half area in a strict sense.

For example, the virtual keyboard control is displayed in a lower half area of the program interface. The lower half area is a half area close to a lower edge in landscape or portrait display. For example, the virtual keyboard control is displayed in at least one of a left half area or a right half area of the program interface. The left half area is a half area close to a left edge in landscape or portrait display. The right half area is a half area close to a right edge in landscape or portrait display. As shown in FIG. 4, the virtual keyboard control includes a left keyboard control 4131 and a right keyboard control 4132. The half area in this embodiment of this application is merely a half area in an approximate sense, and does not refer to a half area in a strict sense.

The input operation in the virtual keyboard control is performed by the user according to needs of the user. For example, as shown in FIG. 4, the user opens a function interface 410 of a search function in an instant messaging program, and enters text or pinyin of "音乐" (music) in an input box control 411 in the function interface 410. According to the input string "音乐" the extension bar control 412 may display the input string "音乐", or the extension bar control 412 may display a predictive string "音乐在线听".

The extension bar control is a control provided by the application. The extension bar control is used as a control bound to the virtual keyboard control for display, but is not provided by the input method program. When a display location or a control height of the virtual keyboard control changes, a display location or a control height of the extension bar control also changes accordingly. For example, the extension bar control is a bar-shaped control. A height of the bar-shaped control is smaller than a height of the entire program interface, and thus the bar-shaped control does not block too much display content in an upper area of the program interface. In an example, a lower edge of the extension bar control is fixed to an upper edge of the virtual keyboard control. In another example, a lower edge of the extension bar control overlaps an upper edge of the virtual keyboard control.

For example, a control width of the extension bar control is the same as a control width of the virtual keyboard control. When there is one virtual keyboard control, there is one extension bar control. As shown in (b) in FIG. 1, there is one virtual keyboard control 113 and one extension bar control 112, and widths thereof are the same. When there are two virtual keyboard controls, there is one or two extension bar controls. For example, the virtual keyboard control includes a left keyboard control displayed in a left area and a right keyboard control displayed in a right area, and the extension bar control also includes a left extension bar control above the left keyboard control and a right extension bar control above the right keyboard control.

For example, the display location of the extension bar control is connected to the display location of the virtual keyboard control. For example, when the virtual keyboard control 113 is displayed in a lower area of the program interface 110, the extension bar control 112 is displayed above the virtual keyboard control 113, as shown in (b) in FIG. 1. When the virtual keyboard control includes a left keyboard control displayed in a left area and a right keyboard control displayed in a right area, the display location of the extension bar control may be above or on a right side of the left keyboard control, or may be above or on a left side of the right keyboard control, or may be at a middle location between the left and right keyboard controls. For example, as shown in FIG. 4, in the function interface 410 running in the foreground, the virtual keyboard control includes a left keyboard control 4131 and a right keyboard control 4132, and the display location of the extension bar control 412 is above the left keyboard control 4131.

The at least one character string displayed in the extension bar control 412 includes: at least one of an input string or a predictive string, the input string being a character string inputted by the input operation, and the predictive string being a character string obtained through word prediction based on the input string.

Step 306: Display a function interface of a target function in response to a select operation on a target string in a displayed character string.

The select operation is an operation for triggering a target string in the extension bar control. The target string is one of one or more character strings displayed in the extension bar control. For example, the select operation includes at least a single-tap operation or a double-tap operation on the target string. The target string is a triggered one of one or more character strings displayed in the extension bar control.

The target string is used for triggering the target function, that is, the target string is a quick entry for triggering the target function. For example, the target function is provided by the application running in the foreground or by another application in the terminal.

In summary, in the interface display method of an application provided in the embodiments of this application, the character string in the extension bar control is triggered to display the function interface of the target function. The method allows a user to quickly switch between interfaces during use of an application. This can be achieved even in case of a hidden function portal of the target function or a deeper level of interaction or when the target function is not provided by a currently used application, thereby reducing operation steps of the user and improving human-computer interaction efficiency.

In the program interface of the application, there are various implementations of displaying the virtual keyboard control and the extension bar control. The extension bar control and the virtual keyboard control may be displayed at the same time, or the extension bar control is displayed later than the virtual keyboard control. The foregoing step 304 includes at least one of the following solutions:

Solution 1: The Virtual Keyboard Control and the Extension Bar Control are Displayed at the Same Time.

The terminal displays the virtual keyboard control and the extension bar control in the program interface in response to a first trigger operation in the program interface. The terminal displays the at least one character string in the extension bar control in response to a first input operation in the virtual keyboard control.

For example, the user opens an instant messaging program in the terminal. The program interface is a home UI. The user taps a search box control in the home UI. The terminal displays the virtual keyboard control and the extension bar control in the home UI in response to the tap operation of the user on the search box.

Solution 2: The Virtual Keyboard Control is Displayed First, and then the Extension Bar Control is Displayed after Presence of an Input String.

The terminal displays the virtual keyboard control in the program interface in response to a second trigger operation in the program interface. The terminal displays the extension bar control in the program interface in response to a second input operation in the virtual keyboard control, the extension bar control displaying the at least one character string.

For example, the user opens an instant messaging program in the terminal. The program interface is a home UI. The user taps a search box control in the home UI. The terminal displays the virtual keyboard control in the home UI in response to the tap operation of the user on the search box. The user taps a key of the virtual keyboard control, and the terminal displays the extension bar control in the home UI in response to the tap operation of the user on the key.

Solution 3: The Virtual Keyboard Control is Displayed First, and then the Extension Bar Control is Displayed after Presence of a Sufficient Number of Predictive Strings.

The terminal displays the virtual keyboard control in the program interface of the application in response to a third trigger operation in the program interface. The terminal displays the extension bar control in the program interface in response to a third input operation in the virtual keyboard control when a total number of at least one character string corresponding to the input operation is not less than a first preset number, the extension bar control displaying the at least one character string.

For example, the first preset number is 3. The user opens an instant messaging program in the terminal. The program interface is a home UI. The user taps a search box control in the home UI. The terminal displays the virtual keyboard control in the home UI in response to the tap operation of the user on the search box. The user taps a key area of the virtual keyboard control and performs an input operation. When a total character string number of input strings and predictive strings reaches 3, the application displays the extension bar control.

The first trigger operation is an operation for triggering display of the virtual keyboard control and the extension bar control. The second trigger operation and the third trigger operation are operations for triggering display of the virtual keyboard control.

For example, the first trigger operation, the second trigger operation, or the third trigger operation includes, but is not limited to at least one of the following operations: a single-tap operation or a double-tap operation on the input box control in the program interface, a single-tap operation or a double-tap operation on the search box control in the program interface, a single-tap operation or a double-tap operation on the text editing control in the program interface, a single-tap operation or a double-tap operation on the chart control in the program interface, a single-tap operation or a double-tap operation on the image processing control in the program interface, or a single-tap operation or a double-tap operation on the document processing control in the program interface.

The first input operation and the second input operation are each an input operation performed in a key area, a handwriting area, or a voice input area of the virtual keyboard control. For example, the first input operation and the second input operation each include, but are not limited to at least one of the following operations: an operation of inputting English letters through the virtual keyboard control, an operation of inputting Chinese letters through the virtual keyboard control, an operation of inputting Chinese through the virtual keyboard control, an operation of inputting at least one of other languages through the virtual keyboard control, or an operation of inputting voice through the virtual keyboard control.

The first preset number is the number of character strings used for triggering the display of the extension bar control, such as at least three predictive strings or four predictive strings. When the number of predictive strings is insufficient, the extension bar control is not displayed. For example, the terminal can modify a preset number according to needs of the user.

In summary, according to the method provided in this embodiment of this application, on the one hand, a display space of a program interface is saved through a trigger display manner of an extension bar control, thereby improving utilization of the program interface and bringing favorable user experience to the user. On the other hand, the trigger display manner of the extension bar control is controlled by using a first preset number, so that the extension bar control can be displayed when there are sufficient predictive strings as much as possible on the basis of saving the display space of the program interface, thereby bringing more effective information to the user.

In the program interface of the application, there are a plurality of manners of display content of the extension bar control. For example, the display content of the extension bar control includes at least an input string and/or a predictive string. To improve utilization efficiency of the extension bar control, the terminal can add corresponding display content to the extension bar control according to needs of the user. The added display content includes, but is not limited to: a name string of a function of the application running in the foreground and a name string of an invocable application provided by the terminal.

For example, the extension bar control further displays a name string of a search function of the application. The method further includes:

displaying a main interface or a search result interface of the search function in response to a fourth trigger operation on the name string.

The main interface is a home UI of the search function. The search result interface is a function interface displaying a search result of the search function for an input string or a particular predictive string, for example, a function interface of a search result for the first predictive string. For example, the fourth trigger operation includes, but is not limited to, a single-tap operation or a double-tap operation on the name string. For example, the search result interface displays at least one search result.

Figure 5:
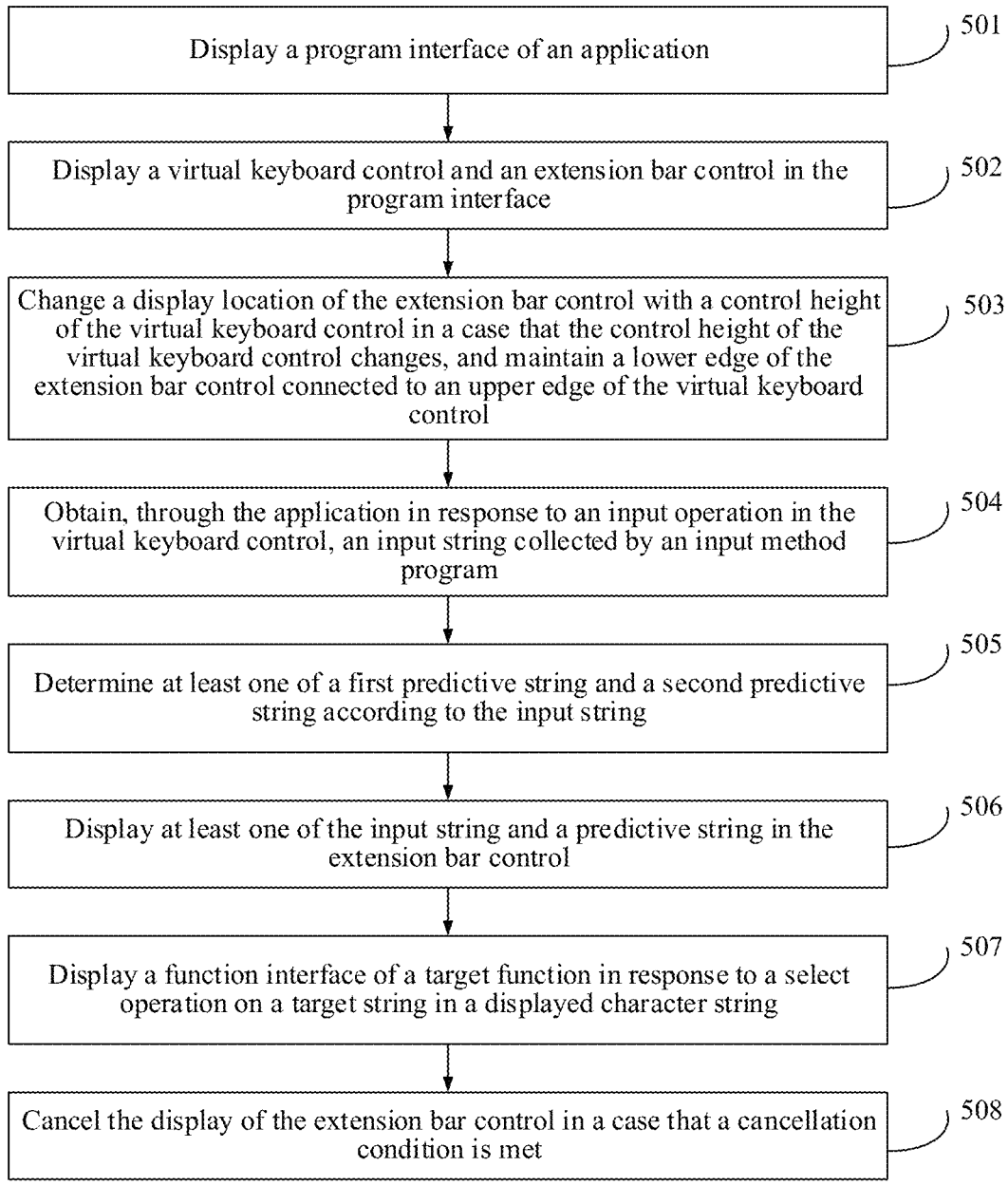
FIG. 5 is a flowchart of an interface display method of an application according to an exemplary embodiment of this application.

FIG. 5 is a flowchart of an interface display method of an application according to another exemplary embodiment of this application. This embodiment is described by using an example in which the method is applied to the terminal 220 shown in FIG. 2. The method may be performed by an application in the terminal 220. The method includes the following steps.

Step 501: Display a program interface of an application.

The application includes one or more functions, including but not limited to: at least one of an address book, a text chat, a voice chat, a memo, an SMS message, an email, a navigation, an album, a calendar, search, an alarm clock, a weather report, audio playback, video playback, or text editing.

The program interface is a UI in the application, such as a home UI, a UI of a particular function, or a UI that provides at least two functions at the same time. For example, the program interface includes a text input control. The text input control includes, but is not limited to: at least one of an input box control, a search box control, a text editing control, a chart control, an image processing control, or a document processing control.

Step 502: Display a virtual keyboard control and an extension bar control in the program interface.

The extension bar control displays at least one character string. The at least one character string is determined according to an input operation in the virtual keyboard control. The virtual keyboard control is a control provided by an input method program. The extension bar control is a control provided by the application.

The at least one character string is determined according to the input operation in the virtual keyboard control. Alternatively, the at least one character string is determined according to an input string inputted by the input operation in the program interface.

For example, the at least one character string includes at least one of an input string or a predictive string. The input string is a character string inputted by the input operation triggered in the virtual keyboard control. The predictive string is a character string obtained through word prediction based on the input string.

For example, the input operation in the virtual keyboard control is performed according to needs of the user. As shown in FIG. 4, the user opens a function interface 410 of a search function in an instant messaging program, and enters text or pinyin of "音乐" in an input box control 411 in the function interface 410. According to the input string "音乐", the extension bar control 412 may display the input string "音乐", or the extension bar control 412 may display a predictive string "音乐在线听".

The virtual keyboard control is a control provided by the input method program. The virtual keyboard control is a control for inputting text content. The virtual keyboard control includes, but is not limited to: at least one of a 26-key English letter keyboard, a 26-key Chinese letter keyboard, a 9-key Chinese letter keyboard, a handwriting input keyboard control, a speech-to-text input keyboard control, a Japanese keyboard, a Korean keyboard, a Russian keyboard, or other minority-language input keyboards. A specific type of the virtual keyboard control is not limited in this embodiment of this application.

For example, the virtual keyboard control is displayed in a lower area of the program interface. The lower area is an area close to a lower edge in landscape or portrait display. For example, the virtual keyboard control is displayed in at least one of a left area or a right area of the program interface. The left area is an area close to a left edge in landscape or portrait display. The right area is an area close to a right edge in landscape or portrait display. As shown in FIG. 4, the virtual keyboard control includes a left keyboard control 4131 and a right keyboard control 4132.

For example, the virtual keyboard control is displayed in a lower half area of the program interface. The lower half area is a half area close to a lower edge in landscape or portrait display. For example, the virtual keyboard control is displayed in at least one of a left half area or a right half area of the program interface. The left half area is a half area close to a left edge in landscape or portrait display. The right half area is a half area close to a right edge in landscape or portrait display. The half area in this embodiment of this application is merely a half area in an approximate sense, and does not refer to a half area in a strict sense.

The extension bar control is a control provided by the application. The extension bar control is used for being bound to the virtual keyboard control for display, but the extension bar control is not provided by the input method program. When a display location or a control height of the virtual keyboard control changes, a display location or a control height of the extension bar control also changes accordingly. For example, the extension bar control is a bar-shaped control. A height of the bar-shaped control is smaller than a height of the entire program interface, and thus the bar-shaped control does not block too much display content in an upper area of the program interface. In an example, a lower edge of the extension bar control is fixed to an upper edge of the virtual keyboard control. In another example, a lower edge of the extension bar control overlaps an upper edge of the virtual keyboard control.

For example, a control width of the extension bar control is the same as a control width of the virtual keyboard control. When there is one virtual keyboard control, there is one extension bar control. As shown in (b) in FIG. 1, there is one virtual keyboard control 113 and one extension bar control 112, and widths thereof are the same. When there are two virtual keyboard controls, there is one or two extension bar controls. For example, the virtual keyboard control includes a left keyboard control displayed in a left area and a right keyboard control displayed in a right area, and the extension bar control also includes a left extension bar control above the left keyboard control and a right extension bar control above the right keyboard control.

For example, the display location of the extension bar control is connected to the display location of the virtual keyboard control. For example, when the virtual keyboard control 113 is displayed in a lower area of the program interface 110, the extension bar control 112 is displayed above the virtual keyboard control 113, as shown in (b) in FIG. 1. For another example, the virtual keyboard control includes a left keyboard control displayed in a left area and a right keyboard control displayed in a right area, the display location of the extension bar control is above or on a right side of the left keyboard control, or above or on a left side of the right keyboard control, or at a middle location between the left and right keyboard controls. For example, as shown in FIG. 4, in the function interface 410 of the application running in the foreground, the virtual keyboard control includes a left keyboard control 4131 and a right keyboard control 4132, and the display location of the extension bar control 412 is above the left keyboard control 4131. Optionally, a search input box control 411 is above the function interface 410.

Step 503: Change a display location of the extension bar control with a control height of the virtual keyboard control when the control height of the virtual keyboard control changes, and maintain a lower edge of the extension bar control connected to an upper edge of the virtual keyboard control.

The control height is a height between a lower edge and the upper edge of the virtual keyboard control.

For example, step 503 is an optional step. During use of the application, because the control height of the virtual keyboard control changes, the display location of the extension bar control changes with the control height of the virtual keyboard control. Control heights of virtual keyboard controls provided in different input method programs are different. In the same input method, when the user switches between virtual keyboard controls with different layouts, the control height of the virtual keyboard control also changes.

For example, the user switches a currently used input method program from a first input method program to a second input method program. For another example, when using the same input method program, the user switches a virtual keyboard control freely between Pinyin 9-key, Pinyin 26-key, handwriting, stroke, Wubi, English 9-key, English 26-key, and other different virtual keyboard layouts.

For example, the display location of the extension bar control is updated with a keyboard height of a second keyboard layout when the virtual keyboard control changes from a first keyboard layout to the second keyboard layout and a keyboard height of the first keyboard layout is different from the keyboard height of the second keyboard layout.

The first keyboard layout and the second keyboard layout are different keyboard layouts of a same input method program, or the first keyboard layout and the second keyboard layout are keyboard layouts of different input method programs.

Figure 6:
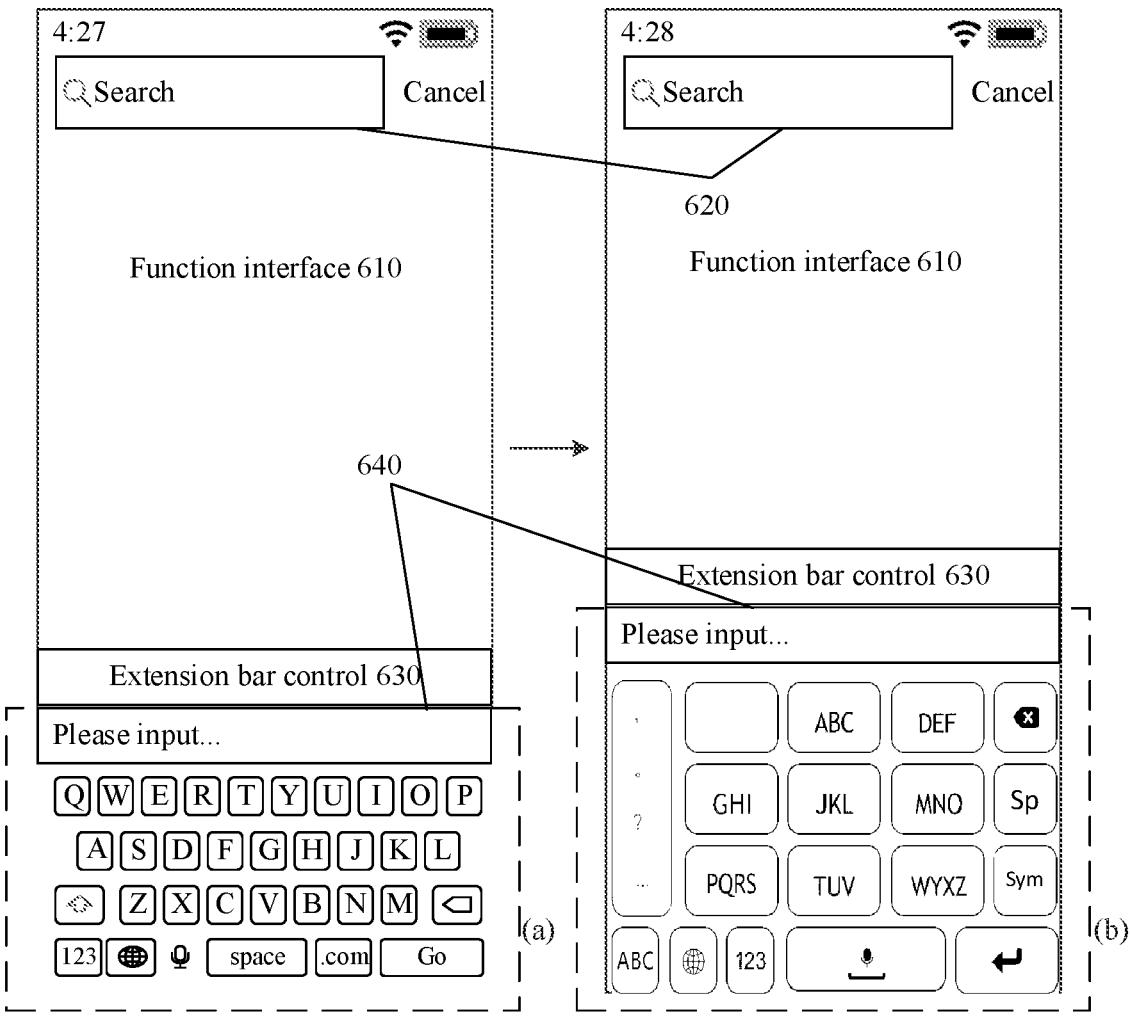
FIG. 6 is a schematic interface diagram of height adjustment of an extension bar control according to an exemplary embodiment of this application.

For example, as shown in (a) in FIG. 6, in a function interface 610 of the application running in the foreground, after the user taps a search box control 620 in the function interface 610, an extension bar control 630 and a virtual keyboard control 640 pop up in the function interface 610. Optionally, a lower edge of the extension bar control 630 and an upper edge of the virtual keyboard control 640 are connected, with no gap therebetween. In this case, a first keyboard layout in the virtual keyboard control 640 is provided by an input method program A.

After the user switches to an input method program B, a change in a second keyboard layout in the virtual keyboard control 640 is shown in (b) in FIG. 6. Through comparison between (a) in FIG. 6 and (b) in FIG. 6, it can be found that a control height of the virtual keyboard control 640 in the first keyboard layout is different from a control height of the virtual keyboard control 640 in the second keyboard layout, and the latter is greater than the former. In this case, as a keyboard height of the second keyboard layout changes, a display location of the extension bar control 630 also changes. The lower edge of the updated extension bar control 630 is still connected to the upper edge of the virtual keyboard control. In addition, a variation range of a height between the lower edge and the lower edge of the function interface 610 of the application is consistent with a variation range of a control height of the virtual keyboard control 640 in the first keyboard layout and the second keyboard layout.

In addition, there are a plurality of possible reasons for the change in the control height of the virtual keyboard control, including but not limited to a change in a function interface of another function in the input method program. For example, heights of function interfaces such as an emoticon function and a setting function provided in the input method program may be different. This is not limited herein.

Step 504: Obtain, through the application in response to an input operation in the virtual keyboard control, an input string collected by an input method program.

The user performs the input operation in the virtual keyboard control. The input operation is used for generating the input string. The input operation includes: at least one of a tap operation triggered on a key of the virtual keyboard control, a sliding operation triggered on a key of the virtual keyboard control, an operation of performing handwriting in a handwriting area of the virtual keyboard control, or an operation of continuous pressing on a voice input button of the virtual keyboard control.

The input method program generates an input string according to the input operation, and transmits the input string to an operating system. The input method program is a default input method program built in the operating system or a third-party input method program installed by the user.

The operating system provides an input event for the application running in the foreground, the input event carrying the input string. For example, the terminal listens for the input event of the operating system through the application, and then extracts the input string from the input event through the application. The input event is generated by the operating system after the input method program collects the input string.

In an example, a text input control is an input box. When the user performs input in the input box, the operating system obtains an input string inputted by the user in real time, and notifies the input string to the application through the input event. When the input string changes, the application can learn of the input string of the user through such an input event.

In an example, the operating system is an Android system, and the input event is a TextWatcher event. In another example, the operating system is an Apple iOS system, and the input event is a UIControlEventEditingChanged event.

Step 505: Determine at least one of a first predictive string and a second predictive string according to the input string.

The input string is a character string inputted by the input operation. The predictive string is a character string obtained through word prediction based on the input string. The word prediction is a function of recommending other related predictive strings by the application based on an inputted input string after presence of the input string.

The application determines the predictive string according to the input string. According to different determining manners, the predictive string includes at least one of a first predictive string or a second predictive string.

The first predictive string is determined in a local word prediction database of the application. The second predictive string is determined in an online word prediction database in a server.

The local word prediction database is a word database constructed by the application based on local data stored in the terminal. For example, the application has a web chat function, and the local word prediction database includes a word database generated based on a historical chat record. For another example, the application has an address book function, and the local word prediction database includes a word database generated based on contact names. For still another example, the application has a blog function, and the local word prediction database includes a word database generated based on blog content. For still another example, the application has a favorites function, and the local word prediction database includes a word database generated based on favorites content.

During determining of the first predictive string, the application uses one or more input characters in the input string as match objects to match the first predictive string related to the input characters in the local word prediction database. At least one predictive character in the first predictive string is the same as or associated with the input character.

The online word prediction database is a word database constructed by the server based on network data. The network data includes, but is not limited to: at least one of data generated when different users use the same application, data generated when different users use different applications, and data of a specified vertical field or all fields captured by a web crawler. For example, the network data is data generated based on hot news data.

During determining of the second predictive string, the application sends a word prediction request to the server, the word prediction request carrying the input string. After receiving the word prediction request, the server obtains the input string from the word prediction request, and uses one or more input characters in the input string as match objects to match the second predictive string related to the input characters in the online word prediction database. At least one predictive character in the second predictive string is the same as or associated with the input character. The server sends the second predictive string to the application.

The local data is not necessarily limited to data generated by the application, but can be other data that the application has access to, and other data is generated by other applications or the operating system. In addition, how the application matches the first predictive string from the local word prediction database and how the server matches the second predictive string from the online word prediction database are not limited in this embodiment. The application can perform the foregoing matching by using a character string matching algorithm such as the Knuth-Morris-Pratt (KMP) algorithm.

In an example, for the input string "音乐", the local word prediction database includes character strings "音乐在线听", "音乐-小程序", and "大鱼 (纯音乐)". After the string "音乐" is inputted, the first predictive string may be "音, 乐在线听, 音乐-小程序, 大鱼(纯音乐)". For example, an online word prediction database obtained after processing by the server includes character strings "i 音乐", "音乐-百科", and "音乐-收藏". In this case, the second predictive string may be "i 音乐、音乐-百科、音乐-收藏.

Step 506: Display at least one of the input string and a predictive string in the extension bar control.

The terminal displays the input string in the extension bar control, or displays one or more predictive strings in the extension bar control, or displays the input string and one or more predictive strings in the extension bar control. The predictive string includes at least one of a first predictive string or a second predictive string.

For example, the extension bar control displays at least two character strings, and the at least two character strings are arranged in horizontal order, with a particular spacing between two adjacent character strings. Each character string can be triggered by a second trigger operation. The second trigger operation may include a single-tap operation, a double-tap operation, a sliding operation, and the like.

Step 507: Display a function interface of a target function in response to a select operation on a target string in the displayed character string.

The select operation is an operation for triggering a target string in the extension bar control. For example, the select operation includes at least a single-tap operation or a double-tap operation on the target string. For example, the target string is a triggered one of one or more character strings displayed in the extension bar control.

For example, the target function may be provided by a current application or by another application. The target function may be at least one of the following three types of functions:

The target function is a first function in the application for processing the target string.
The target function is a second function in the application, a function name of the second function matching the target string.
The target function is a third function in another application invoked by the application, a function name of the third function matching the target string.

Because the third function is provided by the another application, the current application needs to obtain authorization from the another application when the current application needs to invoke the third function.

Step 508: Cancel the display of the extension bar control when a cancellation condition is met.

The application cancels the display of the extension bar control when the cancellation condition is met. This step includes at least one of the following manners:

Manner 1: Cancel the display of the extension bar control in response to a cancel operation in the program interface.

The input method program loses an input focus when the user taps other parts of the program interface. The input method program cancels the display of the virtual keyboard control. The application monitors a display status of the virtual keyboard control. The application cancels the display of the extension bar control when the input method program cancels the display of the virtual keyboard control.

Manner 2: In response to a delete operation in the virtual keyboard control, cancel the display of the extension bar control when the input string is deleted.

When the user performs the delete operation in the virtual keyboard control, the input string displayed in the extension bar control also changes accordingly. After the delete operation ends, if the input string is completely deleted, the application cancels the display of the extension bar control in the program interface.

Manner 3: Delete some characters in the input string in response to a delete operation in the virtual keyboard control to obtain an input string after the deletion; determine one or more predictive strings corresponding to the input string after the deletion; and cancel the display of the extension bar control when the number of the one or more predictive strings is less than a second preset number.

When the user performs the delete operation in the virtual keyboard control, the input string displayed in the extension bar control also changes accordingly. After the delete operation ends, if the number of predictive strings corresponding to the remaining input strings after the deletion is less than the second preset number, the application cancels the display of the extension bar control in the program interface.

In summary, according to the interface display method of an application provided in the embodiments of this application, a display function of the extension bar control is implemented by obtaining at least one of an input string or a predictive string, so that more optional solutions are provided for a user, and interface switching possibilities are covered as much as possible, thereby improving user experience. In particular, through a first predictive string and a second predictive string, display content in the extension bar control is enabled to cover a database stored in a terminal and a word prediction database in a server.

In addition, according to the interface display method of an application provided in the embodiments of this application, an optional solution of adjusting a control height of the extension bar control is provided, so that a display location of the extension bar control changes with a display location of the virtual keyboard control. A space occupied by the extension bar control is reduced as much as possible in case of a limited display space of the program interface to improve a display effect of the program interface and increase utilization of the program interface. In particular, the extension bar control and the virtual keyboard control are set to be connected to each other, thereby reducing a gap between the extension bar control and the virtual keyboard control, and allowing the display space of the program interface to be effectively used.

In addition, according to the interface display method of an application provided in the embodiments of this application, the extension bar control is canceled with the virtual keyboard control, so that the extension bar control is hidden when the user does not need to use the extension bar control, thereby saving the display space of the program interface, increasing the utilization of the program interface, and bringing favorable user experience to the user.

For the First Function, the Following Exemplary Embodiment is Provided:

For example, the first function is a search function in the application. In the interface display method of an application provided in this application, step 506 has the following implementation:

displaying a search result interface in the application in response to a select operation on a target string in a displayed character string.

The search result interface includes: at least one search result obtained by searching for the target string by using the search function of the application.

Figure 7:
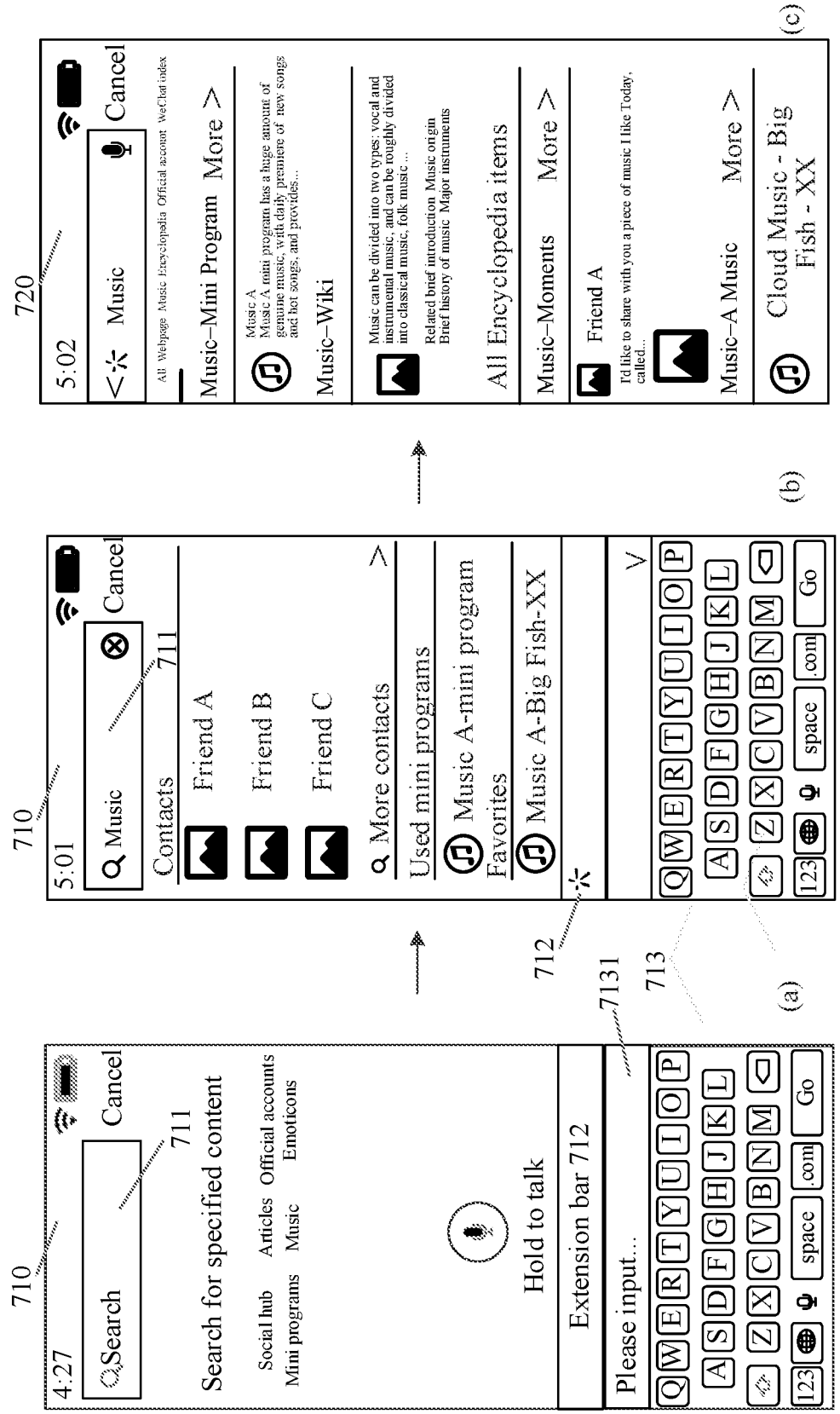
FIG. 7 is a diagram of interface changes of a search function of an application according to an exemplary embodiment of this application.

For example, as shown in (a) in FIG. 7, the application running in the foreground is an instant messaging program, and the program interface is a home UI 710 of the instant messaging program. After the user taps a search box control 711 in the home UI 710, the terminal controls a virtual keyboard control 713 and an extension bar control 712 to pop up in the function interface 710. Optionally, a lower edge of the extension bar control 712 is connected to an upper edge of the virtual keyboard control 713. Optionally, an input string may be displayed in a character input area 7131 of the virtual keyboard control 713, and the input string is provided by the input method program.

In an example, after the user enters the input string "音乐" in the search box control 711 of the home UI 710, the application controls the extension bar control 712 to display character strings "音乐，音乐在线听，音乐，...", as shown in (b) in FIG. 7. For example, the extension bar control 712 further displays a character string "搜一搜" (Search). The character string "搜一搜" can trigger the function interface of the search function of the instant messaging program. After the user taps the character string "搜一搜", the terminal jumps from the home UI 710 to display of a search result interface 720 of the search function of the instant messaging program, as shown in (c) in FIG. 7. For example, the search result interface 720 of the search function includes contents of "音乐-小程序" (Music-Mini Program, "音乐-百科" (Music-Encyclopedia), "音乐-朋友圈" (Music-Moments), and "音乐-音乐" (Music-Music) each with a trigger function. The contents are all search results for the target string "音乐" obtained by using the search function of the instant messaging program.

In an example, after entering the string "音乐" in the search box control 711, the user obtains the foregoing display content of the extension bar control 712. As shown in (b) in FIG. 7, the character strings "音乐、音乐在线听、音乐 ..." displayed in the extension bar control 712 all have the trigger function. The user taps the input string "音乐", and the terminal jumps from the home UI 710 to display of a display interface of a music mini program of the instant messaging program. The terminal plays and records music through the music mini program.

The user taps the predictive string "音乐在线听", and the terminal jumps from the home UI to display of a display interface of an official account of the instant messaging program. A name of the official account in the display interface is "音乐在线听". In addition, the input string "音乐 ..." means there are other predictive strings that have not been fully displayed. Optionally, the user may expand the remaining predictive strings by sliding the extension bar control 712 to the left, or expand the extension bar control downward by tapping a blank area of the extension bar control 712. For example, "音乐 ..." includes a character string "音乐-百科". The user taps the character string "音乐-百科". The terminal jumps from the home UI to display of a search result interface provided by a browser program. The search result interface displays a search result of "音乐-百科".

In summary, according to the interface display method of an application provided in the embodiments of this application, the search function is quickly triggered by displaying the function interface of the search function, so that a manner of easily and quickly triggering a search function is provided for the user while usage of the search function of the application is improved, and more optional search results are provided for the user.

For the Second Function, the Following Embodiment is Provided:

The second function may alternatively be a particular function in the application, a function name of the function being the same as or associated with the target string.

During use of the application, due to different usage frequencies of functions of the application, frequencies of finding function portals of such functions by the user are also different. For example, a usage frequency of a chat session function in an instant messaging program is higher than that of an album function. Due to arrangement requirements or aesthetic needs of the program interface, function portals of some infrequently used functions are hidden or set with deeper interaction levels. For example, a function portal of a receipt and payment function in the instant messaging program is set under a payment function, and the user needs to perform a trigger operation in a program interface of a main menu of the instant messaging program to enter a function portal of the payment function. Therefore, quick display of a function interface of a frequently used function helps provide convenience for the user.

Optionally, the second function includes at least one of a payment graphic code function, a receipt graphic code function, a communication function, or a transmission function. In the interface display method of an application provided in this application, step 507 has the following implementation:

displaying a function interface of the second function in the application in response to a select operation on a target string in a displayed character string.

Figure 8:
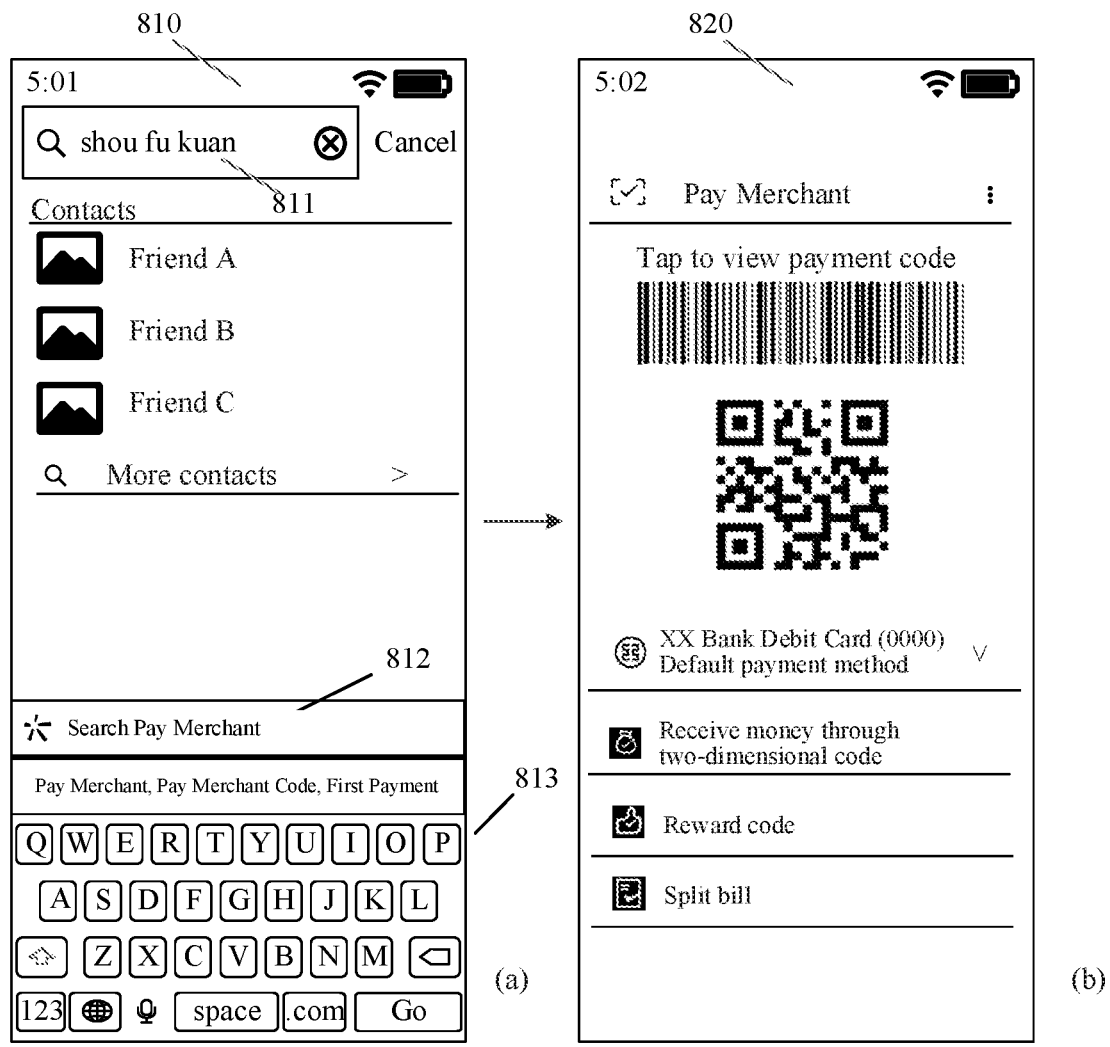
FIG. 8 is a diagram of interface changes of a payment graphic code function of an application according to an exemplary embodiment of this application.

Three different exemplary descriptions are provided below by using the instant messaging program as an example:

As shown in (a) in FIG. 8, it is assumed that the user needs to switch from a home UI 810 of the instant messaging program to a UI 820 of a payment two-dimensional code function. In the related art, the user needs to trigger a function interface of a menu in a home UI, and trigger a function interface of a payment function in the function interface of the menu. After the function interface of the payment function triggers a function interface of a receipt and payment function, the terminal displays the UI 820 of the payment two-dimensional code function.

In this embodiment of this application, the user enters a character string "shou fu kuan" in a search box control 811 of the home UI 810. In response to this input operation, character strings "收付款、收付款记录、首付..." appear in an extension bar control 812 of the instant messaging program control. Optionally, the virtual keyboard control 813 displays a character string "收付款、收付款码、首付款、首付、首富", and this character string is provided by the input method program.

After the user taps the character string "收付款" in the extension bar control 812, the terminal jumps from the home UI 810 to display of the UI 820 of the payment two-dimensional code function of the instant messaging program, as shown in (b) in FIG. 8. A payment two-dimensional code is displayed in the UI 820 after the jump, and the user may perform a payment operation directly in the UI 820. Optionally, the UI 820 after the jumping displays a control "Receive money through two-dimensional code". The user may trigger the control "Receive money through two-dimensional code". The terminal jumps from the UI 820 of the payment two-dimensional code function to display of a UI of a money collection two-dimensional code function.

In an example, the user may enter a character string "收款", "shou kuan", or "收款码", or other related contents in the search box control 811 of the home UI 810 of the instant messaging program. The instant messaging program controls the extension bar control 812 to display the foregoing entered character string and/or a predictive string. The user may trigger the foregoing character string to implement jumping of the UI of the money collection two-dimensional code function.

The foregoing embodiment provides a schematic interface diagram of interface changes of the payment two-dimensional code function of the instant messaging program. Interface changes of a receipt two-dimensional code function are similar, and details are not described again. In the foregoing embodiment, quick payment or receipt in the application is achieved by providing the extension bar control.

Figure 9:
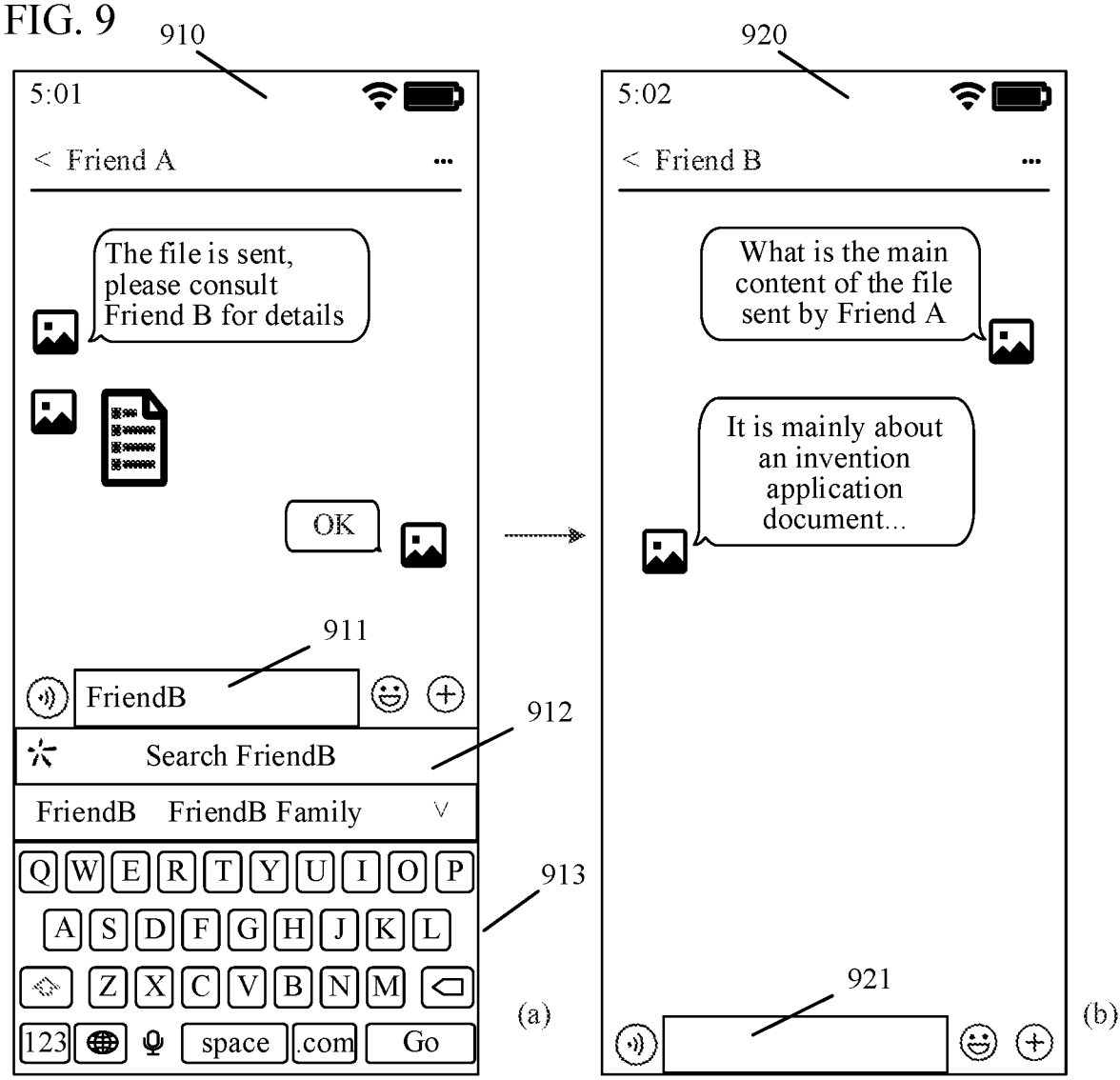
FIG. 9 is a diagram of interface changes of a communication function of an application according to an exemplary embodiment of this application.

As shown in (a) in FIG. 9, it is assumed that the user needs to switch from a function interface 910 of a chat session with a friend A to a function interface 920 of a chat session with a friend B. In the related art, the user needs to trigger a back key in the function interface 910 of the chat session with the friend A to return to the home UI of the instant messaging program, open a function interface of an address book to find a location of the friend B, or find a location of the friend B in the home UI, and then enter the function interface 920 of the chat session with the friend B.

In this embodiment of this application, the user enters a character string "好友B" (friend B) in an input box control 911 of a function interface 910 of a chat session with the friend A. In response to this input operation, the instant messaging program controls the extension bar control 912 to show character strings "搜一搜","好友 ","聊天记录B" and "聊天记录" (Search, Friend B, and Chat history). Optionally, the virtual keyboard control 913 displays a predictive string "好友B、好友B家、的、总、是", and the character string is provided by the input method program.

The user taps the character string "好友B" in the extension bar control 912. The terminal switches from the function interface 910 of the chat session with the friend A to the function interface 920 of the chat session with the friend B. As shown in (b) in FIG. 9, the user communicates with the friend B in the function interface 920 after the jumping.

In addition, the character string "搜一搜" (search) in the extension bar control 912 can trigger a main interface or a search result interface of the search function in the instant messaging program. The character string "聊天记录" (chat history) can trigger a function interface of a record function in the instant messaging program. The user can jump from the function interface 910 of the chat session with the friend A to the function interface of the record function of the instant messaging program by tapping the character string "聊天记录". The function interface displays all chat sessions related to "好友B" and chat contents.

The foregoing embodiment provides a schematic interface diagram of interface changes of a communication function of an application, and implements switching between function interfaces of the communication function in the application, including at least two optional manners of jumping from one sub-interface in a function interface of the communication function to another sub-interface, and jumping from another function interface of the application to the function interface of the communication function, which are not limited herein.

Figure 10:
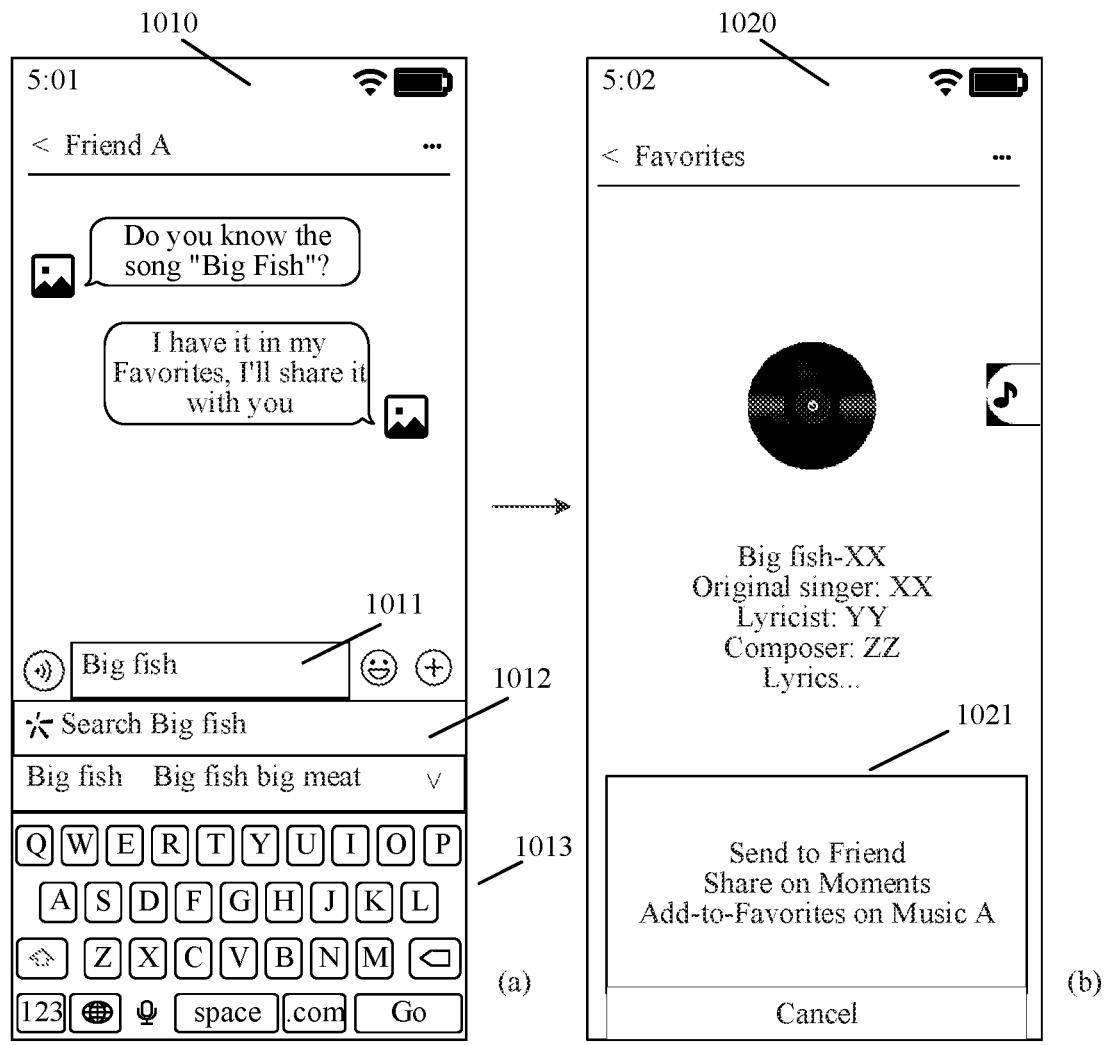
FIG. 10 is a diagram of interface changes of a transmission function of an application according to an exemplary embodiment of this application.

As shown in (a) in FIG. 10, it is assumed that the user needs to switch from a function interface 1010 of a chat session with a friend A to a transmission interface 1020 of a favorites function. In the related art, the user needs to trigger a back key in the function interface 1010 of the chat session with the friend A to return to the home UI of the instant messaging program, trigger a function interface of a menu in the home UI, trigger a function interface of the favorites function in the function interface of the menu, find, in the function interface of the favorites function, content to be transmitted, and trigger the transmission interface 1020 for transmission content.

In this embodiment of this application, the user enters a character string "大鱼" (Big Fish) in an input box control 1011 in the function interface 1010 of the chat session with the friend A. In response to this input operation, the instant messaging program controls the extension bar control 1012 to show character strings "收藏-大鱼" (Favorites—Big Fish) and "大鱼-百科" (Big Fish—Encyclopedia).

The user taps the character string "收藏-大鱼". The terminal jumps from the function interface 1010 of the chat session with the friend A to display of the transmission interface 1020 of the favorites function of the instant messaging program. As shown in (b) in FIG. 10, the transmission interface 1020 displays a transmission box control 1021. The transmission box control 1021 displays options "Send to Friend", "Share on Moments", "Add-to-Favorites on Music A", and "Cancel". The user taps the option "Send to Friend", and selects the friend A in the transmission interface 1020. The instant messaging program transmits an audio file displayed in the transmission interface 1020 to the function interface 1010 of the chat session with the friend A, to implement audio transmission to a contact.

In addition, a character string "搜一搜" (Search) displayed in the extension bar control can trigger a function interface of the search function of the instant messaging program. The character string "大鱼-百科" can trigger a program interface of a browser application.

The foregoing embodiment provides a schematic interface diagram of interface changes of a transmission function of an application, and implements quick switching between function interfaces of the transmission function of the application, making it easier to use a transmission function of a frequently used application.

In summary, according to the interface display method of an application provided in the embodiments of this application, a function interface of a frequently used function of the application is quickly displayed by displaying the function interface of the second function of the application. This method enables the user to quickly switch between interfaces, and provides convenience for the user in use of the frequently used function while arrangement requirements and/or aesthetic needs of the program interface of the application are met, thereby reducing user operations, improving human-computer interaction efficiency, and improving user experience.

For the Third Function, the Following Embodiment is Provided:

The target function may alternatively be a third function in another application, a function name of the third function being the same as or associated with the target string. The third function is a function that the application is authorized to invoke in the another application.

Figure 11:
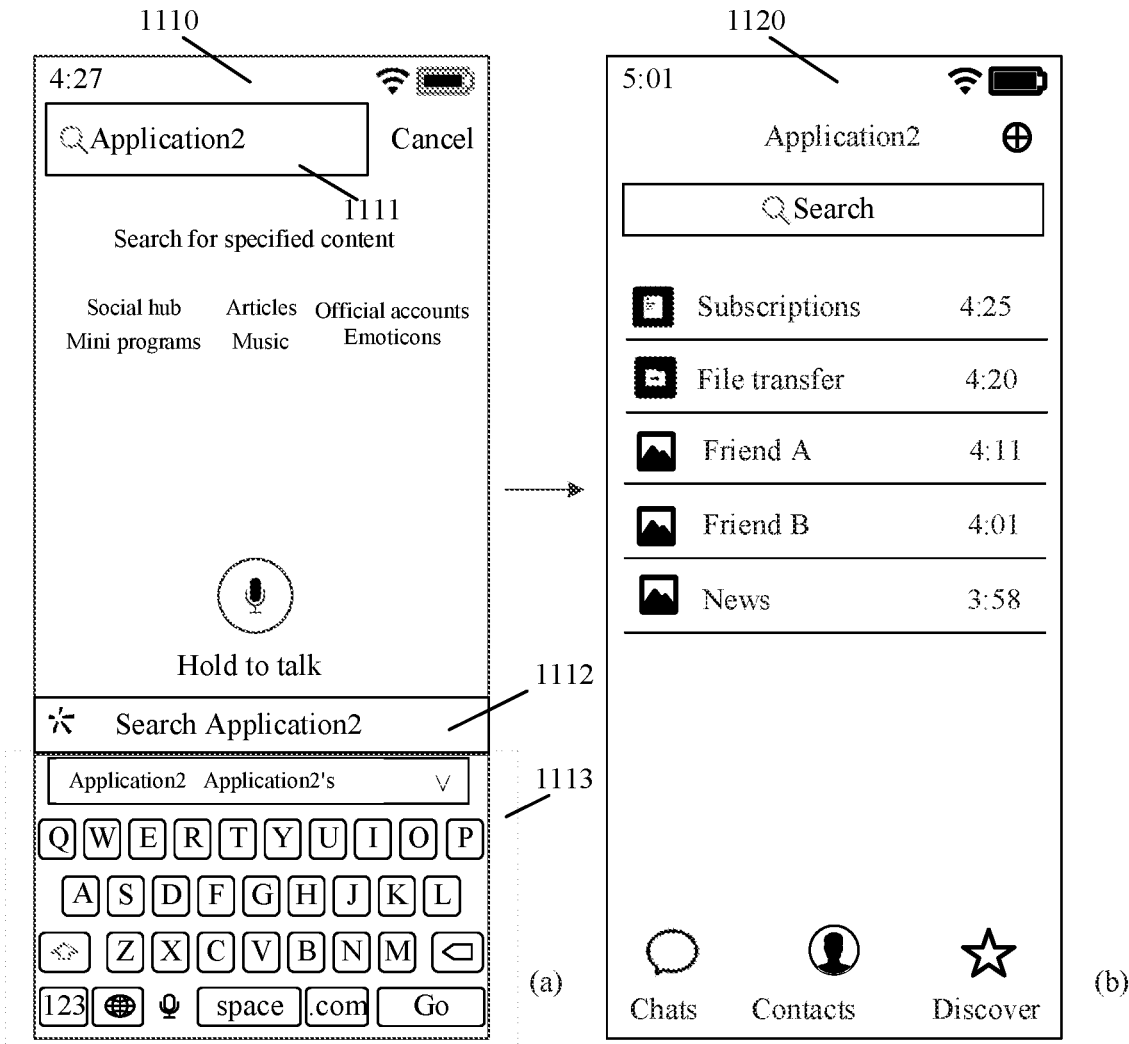
FIG. 11 is a diagram of interface changes of another application invoked by an application according to an exemplary embodiment of this application.

For example, as shown in FIG. 11, it is assumed that the user needs to switch from a program interface 1110 of the instant messaging program to a function interface 1120 of an application 2. In the related art, the user needs to trigger a back key in the program interface 1110 of the instant messaging program to return to a display interface of a menu of the terminal, find a location of the application 2 in the display interface of the menu of the terminal, and trigger the function interface 1120 of the application 2.

In this embodiment of this application, as shown in (a) in FIG. 11, the user enters a character string "应用程序2" (Application 2) in a search box control 1111 of the program interface 1110 of the instant messaging program. In response to this input operation, the instant messaging program controls the extension bar control 1112 to display the character string "应用程序2". Optionally, the virtual keyboard control 1113 displays a predictive string "应用程序2, 应用程序 2 的", and the character string is provided by the input method program. Optionally, the user may trigger a microphone control to record audio information "应用程序2". In response to the trigger operation, the instant messaging program processes and then converts the inputted audio information into a character string "应用程序2", and displays the character string in the extension bar control 1112. The user taps the character string "应用程序2" in the extension bar control 1112. The terminal jumps from the program interface 1110 of the instant messaging program to display of the function interface 1120 of the application 2, as shown in (b) in FIG. 11.

In summary, according to the interface display method of an application provided in the embodiments of this application, interface jumping can be implemented within an application and between applications. This method effectively resolves the problem of complex operation steps of the user during use.

Figure 12:
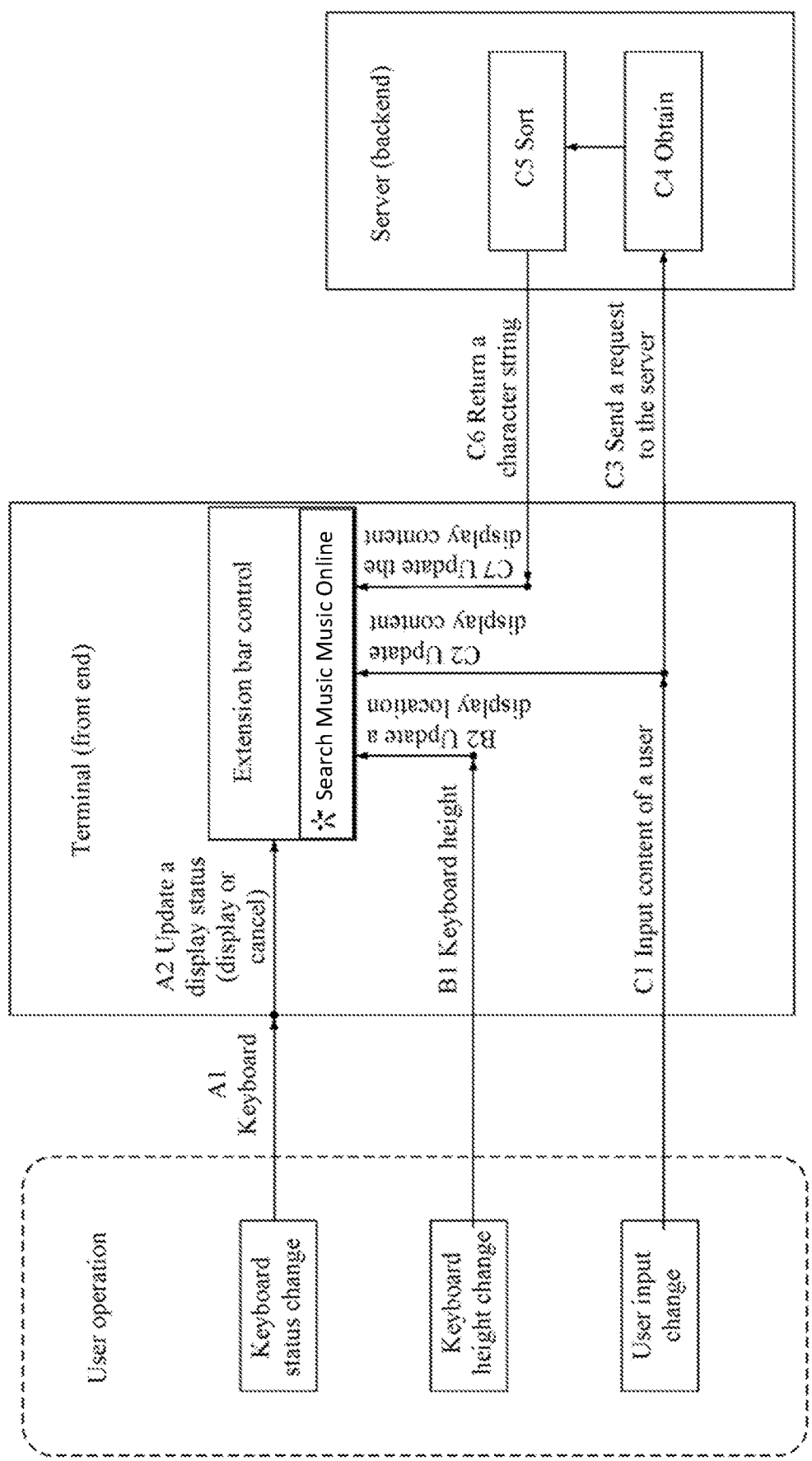
FIG. 12 is a schematic principle diagram of an interface display method of an application according to an exemplary embodiment of this application.

FIG. 12 is a schematic principle diagram of an interface display method of an application according to an exemplary embodiment of this application. The interface display method of the application is related to three aspects: a user operation, a terminal, and a server. The terminal listens for a related attribute of a virtual keyboard control and input content of a user in a program interface through an existing system interface. The terminal controls display/hiding of an extension bar control and a control height thereof, and displays a character string in the extension bar control.

On the one hand, the extension bar control is affected by a change in the virtual keyboard control, as shown in steps A1 and A2.

Step A1: The terminal listens for a keyboard status of the virtual keyboard control and obtains the related attribute.

Step A2: The terminal updates a display status of the extension bar control.

For example, the terminal displays the extension bar control after an input method program in the program interface obtains an input focus; and the terminal cancels the extension bar control after the input method program loses the input focus. For example, the user taps an input box control in the program interface, and the extension bar control pops up from a lower edge of the program interface.

The extension bar control is affected by a keyboard height change, as shown in steps B1 and B2.

Step B1: The terminal listens for a keyboard height change of the virtual keyboard control and obtains a related attribute.

Step B2: The terminal updates a display location of the extension bar control.

For example, the keyboard height change refers to a change in a control height of the virtual keyboard control. For example, an initial height of the virtual keyboard control is 0, that is, an upper edge of the virtual keyboard control overlaps the lower edge of the program interface. For example, after the user switches to an input method program B in the program interface, the terminal obtains a keyboard height of the input method program B. The terminal updates the display location of the extension bar control in the program interface. Optionally, a lower edge of the extension bar control is connected to the upper edge of the virtual keyboard control.

The extension bar control is affected by a user input change, as shown in steps C1 to C7.

Step C1: The terminal listens for an input operation and obtains input content of the user.

Step C2: The terminal updates display content of the extension bar control.

Step C3: The terminal sends an obtaining request of a string to a server.

Step C4: The server obtains candidate strings.

Step C5: The server sorts the candidate strings.

Step C6: The terminal obtains a second predictive string after the sorting by the server.

Step C7: The terminal updates the display content of the extension bar control.

For example, the terminal listens for an input event through the application, the input event carrying an input string. The terminal obtains the input content of the user through the input event. For example, the terminal sends an obtaining request to the server, the obtain request carrying the input content of the user. The server receives the obtaining request sent by the terminal, and generates candidate strings based on a word prediction database. For example, the sorting operation performed by the server on the candidate strings is performed based on any one of sorting algorithms, and this is not limited herein. For example, the user enters a character string "音乐" in the input box control of the program interface. The terminal obtains the character string "音乐" and sends an obtaining request to the server. The server obtains related character strings "'音乐","音乐相册","音乐播放"," 音乐喷泉","音乐家", and "音乐在线听" from an online word prediction database, sorts the character strings, and returns the sorted character strings to the terminal. The terminal obtains target strings "'音乐","音乐相册", and "音乐在线听" and displays the character strings in the extension bar control.

The following is an apparatus embodiment of this application. For details not described in detail in the apparatus embodiment, reference may be made to corresponding record in the foregoing method embodiments. Details are not described herein again.

Figure 13:
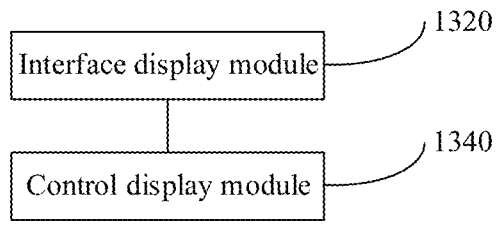
FIG. 13 is a schematic structural diagram of an interface display apparatus of an application according to an exemplary embodiment of this application.

FIG. 13 is a schematic structural diagram of an interface display apparatus of an application according to an exemplary embodiment of this application. The apparatus may be implemented as an entire terminal or a part of a terminal by using software, hardware, or a combination thereof. The apparatus includes: an interface display module 1320 and a control display module 1340.

The interface display module 1320 may be configured to display a program interface of an application.

The control display module 1340 is configured to display a virtual keyboard control and an extension bar control in the program interface, the extension bar control displaying at least one character string, the at least one character string being determined according to an input operation in the virtual keyboard control, the virtual keyboard control being a control provided by an input method program, and the extension bar control being a control provided by the application.

The interface display module 1320 is further configured to display a function interface of a target function in response to a select operation on a target string in the displayed character string.

In an embodiment, the control display module 1340 is further configured to:

display the virtual keyboard control and the extension bar control in the program interface in response to a first trigger operation in the program interface; and display the at least one character string in the extension bar control in response to a first input operation in the virtual keyboard control.

In an embodiment, the control display module 1340 is further configured to:

display the virtual keyboard control in the program interface in response to a second trigger operation in the program interface; and display the extension bar control in the program interface in response to a second input operation in the virtual keyboard control, the extension bar control displaying the at least one character string.

In an embodiment, the control display module 1340 is further configured to:

display the virtual keyboard control in the program interface in response to a third trigger operation in the program interface; and display the extension bar control in the program interface in response to a third input operation in the virtual keyboard control when a total number of at least one character string corresponding to the input operation is not less than a first preset number, the extension bar control displaying the at least one character string.

In an embodiment, the extension bar control further displays a name string of a search function of the application, and the control display module 1340 is further configured to:

display a main interface or a search result interface of the search function in response to a fourth trigger operation on the name string.

In an embodiment, the target function is a first function in the application for processing the target string; or the target function is a second function in the application; or the target function is a third function in another application invoked by the application. A function name of the second function matches the target string. A function name of the third function matches the target string.

In an embodiment, the first function is a search function in the application. The interface display module is further configured to display a search result interface in the application.

In an embodiment, the second function includes at least one of a payment graphic code function, a receipt graphic code function, a communication function, or a transmission function. The interface display module is further configured to display a function interface of the second function in the application.

Figure 14:
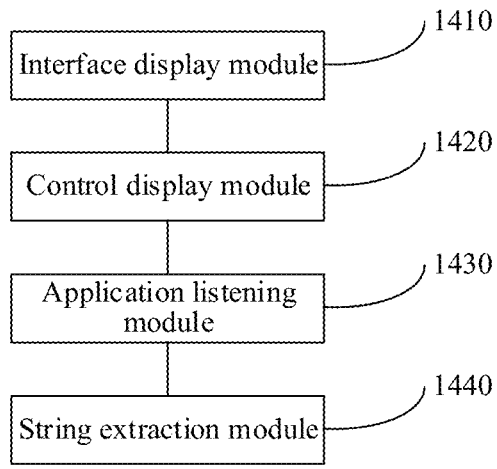
FIG. 14 is a schematic structural diagram of an interface display apparatus of an application according to an exemplary embodiment of this application.

FIG. 14 is a schematic structural diagram of an interface display apparatus of an application according to another exemplary embodiment of this application. The apparatus may be implemented as an entire terminal or a part of a terminal by using software, hardware, or a combination thereof. The apparatus includes: an interface display module 1410, a control display module 1420, an application listening module 1430, and a string extraction module 1440. The application listening module 1430 and the string extraction module 1440 are optional modules.

The interface display module 1410 may be configured to display a program interface of an application.

The control display module 1420 is configured to display a virtual keyboard control and an extension bar control in the program interface, the extension bar control displaying at least one character string, the at least one character string being determined according to an input operation in the virtual keyboard control, the virtual keyboard control being a control provided by an input method program, and the extension bar control being a control provided by the application.

The application listening module 1430 is configured to listen for an input event of an operating system through the application, the input event being generated by the operating system after the input method program collects the input string.

The string extraction module 1440 is configured to extract the input string from the input event through the application.

The control display module 1420 is further configured to determine at least one of a first predictive string and a second predictive string according to the input string, the first predictive string being determined in a local word prediction database of the application, and the second predictive string being determined in an online word prediction database in a server.

The control display module 1420 is further configured to display at least one of an input string and a predictive string in the extension bar control, the input string being a character string inputted by the input operation, and the predictive string being a character string obtained through word prediction based on the input string.

The interface display module 1410 is further configured to display a function interface of a target function in response to a select operation on a target string in the displayed character string.

In an embodiment, the control display module 1420 is further configured to change a display location of the extension bar control with a control height of the virtual keyboard control when the control height of the virtual keyboard control changes, and maintain the lower edge of the extension bar control connected to the upper edge of the virtual keyboard control; the control height being a height between a lower edge and the upper edge of the virtual keyboard control.

In an embodiment, the control display module 1420 is further configured to update a display location of the extension bar control with a keyboard height of a second keyboard layout when the virtual keyboard control changes from a first keyboard layout to the second keyboard layout and a keyboard height of the first keyboard layout is different from the keyboard height of the second keyboard layout; the first keyboard layout and the second keyboard layout being different keyboard layouts of a same input method program, or the first keyboard layout and the second keyboard layout being keyboard layouts of different input method programs.

In an embodiment, the interface display module 1410 is further configured to:
cancel the display of the extension bar control in response to a cancel operation in the program interface.

In an embodiment, the interface display module 1410 is further configured to:
in response to a delete operation in the virtual keyboard control, cancel the display of the extension bar control when the input string is deleted.

In an embodiment, the interface display module 1410 is further configured to:
delete some characters in the input string in response to a delete operation in the virtual keyboard control to obtain an input string after the deletion; determine one or more predictive strings corresponding to the input string after the deletion; and canceling the display of the extension bar control when the number of the one or more predictive strings is less than a second preset number.

Figure 15:
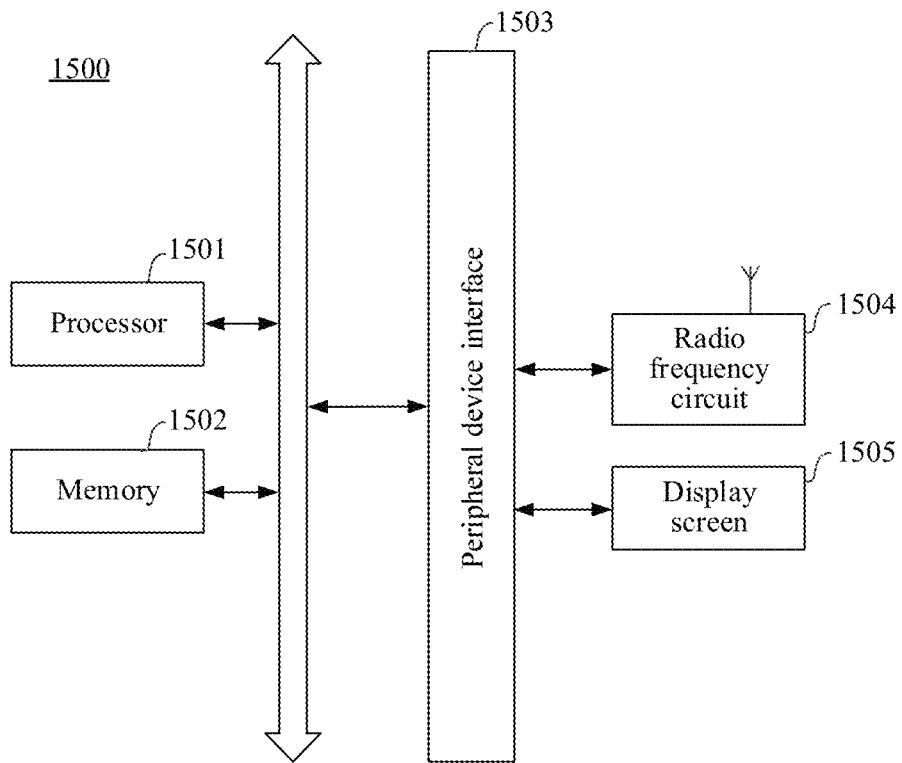
FIG. 15 is a schematic structural diagram of a computer device according to an exemplary embodiment of this application.

The following describes a computer device applied to this application. FIG. 15 is a structural block diagram of a computer device 1500 according to an exemplary embodiment of this application. The computer device 1500 is a portable mobile terminal, such as a smartphone, a tablet computer, a moving picture experts group audio layer III (MP3) player, or a moving picture experts group audio layer IV (MP4) player. The computer device 1500 may be further referred to as another name such as user equipment or a portable terminal.

The computer device 1500 includes: a processor 1501 and a memory 1502.

The processor 1501 may include one or more processing cores, for example, a 4-core processor or an 8-core processor. The processor 1501 may be implemented by using at least one hardware form of a digital signal processor (DSP), a field-programmable gate array (FPGA), and a programmable logic array (PLA).

The memory 1502 may include one or more computer-readable storage media. The computer-readable storage medium may be tangible and non-transient. The memory 1502 may further include a high-speed random access memory and a non-volatile memory, for example, one or more disk storage devices or flash memory devices.

In some embodiments, the computer device 1500 further optionally includes: a peripheral device interface 1503 and at least one peripheral device. Specifically, the peripheral device includes: at least one of a radio frequency circuit 1504 or a display screen 1505.

The peripheral interface 1503 may be configured to connect at least one peripheral related to input/output (I/O) to the processor 1501 and the memory 1502. In some embodiments, the processor 1501, the memory 1502, and the peripheral interface 1503 are integrated on the same chip or the same circuit board. In some other embodiments, any or both of the processor 1501, the memory 1502, and the peripheral interface 1503 may be implemented on an independent chip or circuit board, which is not limited in this embodiment.

The radio frequency circuit 1504 is configured to receive and transmit a radio frequency (RF) signal, which is also referred to as an electromagnetic signal. The radio frequency circuit 1504 communicates with a communication network and other communication devices through the electromagnetic signal. The radio frequency circuit 1504 converts an electrical signal into an electromagnetic signal for transmission, or converts a received electromagnetic signal into an electrical signal.

The display screen 1505 is configured to display a user interface (UI). The UI may include a graph, a text, an icon, a video, a combination thereof any combination thereof.

The display screen 1505 also has a capability of collecting a touch signal on or above a surface of the display screen 1505. The touch signal may be inputted, as a control signal, to the processor 1501 for processing. The display screen 1505 is configured to provide a virtual button and/or a virtual keyboard, which is also referred to as a soft button and/or a soft keyboard.

A person skilled in the art may understand that the structure shown in FIG. 15 does not constitute any limitation on the computer device 1500, and the computer device may include more components or fewer components than those shown in the figure, or some components may be combined, or a different component deployment may be used.

This application further provides a computer device. The computer device includes: a processor and a memory, the memory storing at least one program, the at least one program being loaded and executed by the processor to implement the following steps:
displaying a program interface of an application;
displaying a virtual keyboard control and an extension bar control in the program interface, the extension bar control displaying at least one character string, the at least one character string being determined according to an input operation in the virtual keyboard control, the virtual keyboard control being a control provided by an input method program, and the extension bar control being a control provided by the application; and
displaying a function interface of a target function in response to a select operation on a target string in the displayed character string.

In an embodiment, the at least one program is loaded and executed by the processor to implement the following steps:
displaying the virtual keyboard control and the extension bar control in the program interface in response to a first trigger operation in the program interface; and
displaying the at least one character string in the extension bar control in response to a first input operation in the virtual keyboard control.

In an embodiment, the at least one program is loaded and executed by the processor to implement the following steps:
displaying the virtual keyboard control in the program interface in response to a second trigger operation in the program interface; and displaying the extension bar control in the program interface in response to a second input operation in the virtual keyboard control, the extension bar control displaying the at least one character string.

In an embodiment, the at least one program is loaded and executed by the processor to implement the following steps:
displaying the virtual keyboard control in the program interface in response to a third trigger operation in the program interface; and displaying the extension bar control in the program interface in response to a third input operation in the virtual keyboard control when a total number of at least one character string corresponding to the input operation is not less than a first preset number, the extension bar control displaying the at least one character string.

In an embodiment, the at least one character string includes:
    at least one of an input string and a predictive string, the input string being a character string inputted by the input operation, and the predictive string being a character string obtained through word prediction based on the input string.

In an embodiment, a lower edge of the extension bar control is connected to an upper edge of the virtual keyboard control; and
    the at least one instruction is loaded and executed by the processor to implement the following steps:
    changing a display location of the extension bar control with a control height of the virtual keyboard control when the control height of the virtual keyboard control changes, and maintaining the lower edge of the extension bar control connected to the upper edge of the virtual keyboard control;
    the control height being a height between a lower edge and the upper edge of the virtual keyboard control.

In an embodiment, the extension bar control further displays a name string of a search function of the application; and
    the at least one instruction is loaded and executed by the processor to implement the following steps:
    displaying a main interface or a search result interface of the search function in response to a fourth trigger operation on the name string.

In an embodiment, the at least one program is loaded and executed by the processor to implement the following step:
    canceling the display of the extension bar control in response to a cancel operation in the program interface.

In an embodiment, the at least one program is loaded and executed by the processor to implement the following step:
    in response to a delete operation in the virtual keyboard control, canceling the display of the extension bar control when the input string is deleted.

In an embodiment, the at least one program is loaded and executed by the processor to implement the following steps:
    deleting some characters in the input string in response to a delete operation in the virtual keyboard control to obtain an input string after the deletion;
    determining one or more predictive strings corresponding to the input string after the deletion; and
    canceling the display of the extension bar control when the number of the one or more predictive strings is less than a second preset number.

In an embodiment, the at least one program is loaded and executed by the processor to implement the following step:
    determining at least one of a first predictive string and a second predictive string according to the input string, the first predictive string being determined in a local word prediction database of the application, and the second predictive string being determined in an online word prediction database in a server.

In an embodiment, the at least one program is loaded and executed by the processor to implement the following steps:
    listening for an input event of an operating system through the application, the input event being generated by the operating system after the input method program collects the input string; and
    extracting the input string from the input event through the application.

In an embodiment,
    the target function is a first function in the application for processing the target string;
    or
    the target function is a second function in the application, a function name of the second function matching the target string;
    or
    the target function is a third function in another application invoked by the application, a function name of the third function matching the target string.

In an embodiment, the first function is a search function in the application; and
    the at least one instruction is loaded and executed by the processor to implement the following step:
    displaying a search result interface in the application, the search result interface including at least one search result obtained by searching for the target string by using the search function.

In an embodiment, the at least one program is loaded and executed by the processor to implement the following step:
    displaying a function interface of the second function in the application, the second function including at least one of a payment graphic code function, a receipt graphic code function, a communication function, and a transmission function.

In an embodiment, the at least one program is loaded and executed by the processor to implement the following step:
    updating a display location of the extension bar control with a keyboard height of a second keyboard layout when the virtual keyboard control changes from a first keyboard layout to the second keyboard layout and a keyboard height of the first keyboard layout is different from the keyboard height of the second keyboard layout;
    the first keyboard layout and the second keyboard layout being different keyboard layouts of a same input method program, or the first keyboard layout and the second keyboard layout being keyboard layouts of different input method programs.

An embodiment of this application further provides a computer-readable storage medium, the storage medium storing at least one program, the at least one program being loaded and executed by a processor to implement the interface display method of an application according to the foregoing method embodiments.

An embodiment of this application further provides a computer program product or a computer program. The computer program product or the computer program includes computer instructions, the computer instructions being stored in a computer-readable storage medium, and being loaded and executed by a processer to implement the interface display method of an application according to the foregoing method embodiments.

"Plurality of" mentioned in this specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely embodiments of this application, but are not intended to limit this application. Any modification, equivalent replacement, or improvement made within the spirit and principle of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method of displaying information in a program interface of an application performed by a computer device, the method comprising:
   displaying a virtual keyboard control and a search box control in the program interface;
   in response to an input operation in the search box control, displaying, in a first region of the program interface, one or more contacts matching user input associated with the input operation; and
   displaying at least one character string in an extension bar control next to the virtual keyboard control, the at least one character string including the user input and at least one extra character being determined according to the user input in the virtual keyboard control, and the extension bar control is distinct from the search box control; and
   in response to a select operation on a target string among the at least one character string in the extension bar control, displaying a function interface of applying a target function to the target string.

2. The method according to claim 1, wherein:
   the virtual keyboard control is displayed in the program interface in response to a user tap operation in the program interface; and
   the extension bar control is displayed in the program interface when a total number of the at least one character string corresponding to the input operation is not less than a first preset number.

3. The method according to claim 1, wherein the extension bar control further displays a name string of a search function of the application; and
   the method further comprises:
   displaying a main interface or a search result interface of the search function in response to a trigger operation on the name string.

4. The method according to claim 1, wherein the method further comprises:
   in response to a delete operation in the virtual keyboard control, canceling the display of the extension bar control when the user input is deleted.

5. The method according to claim 1, wherein the at least one character string comprises:
   at least one of an input string and a predictive string, the input string being a character string inputted by the input operation, and the predictive string being a character string obtained through word prediction based on the input string.

6. The method according to claim 5, wherein the method further comprises:
   determining at least one of a first predictive string and a second predictive string according to the input string, the first predictive string being determined in a local word prediction database of the application, and the second predictive string being determined in an online word prediction database by a server.

7. The method according to claim 1, wherein
   the target function is a first function in the application for processing the target string;
   or
   the target function is a second function in the application, a function name of the second function matching the target string;
   or
   the target function is a third function in another application invoked by the application, a function name of the third function matching the target string.

8. A computer device for displaying information in a program interface of an application, the computer device comprising:
   a display;
   a processor; and
   a memory, the memory storing at least one program that, when executed by the processor, cause the computer device to perform a plurality of operations comprising:
   displaying a virtual keyboard control and a search box control in the program interface;
   in response to an input operation in the search box control, displaying, in a first region of the program interface, one or more contacts matching user input associated with the input operation; and
   displaying at least one character string in an extension bar control next to the virtual keyboard control, the at least one character string including the user input and at least one extra character being determined according to the user input in the virtual keyboard control and the extension bar control is distinct from the search box control; and
   in response to a select operation on a target string among the at least one character string in the extension bar control, displaying a function interface of applying a target function to the target string.

9. The computer device according to claim 8, wherein:
   the virtual keyboard control is displayed in the program interface in response to a user tap operation in the program interface; and
   the extension bar control is displayed in the program interface when a total number of the at least one character string corresponding to the input operation is not less than a first preset number.

10. The computer device according to claim 8, wherein the extension bar control further displays a name string of a search function of the application; and
    the plurality of operations further comprises:
    displaying a main interface or a search result interface of the search function in response to a trigger operation on the name string.

11. The computer device according to claim 8, wherein the plurality of operations further comprises:
    in response to a delete operation in the virtual keyboard control, canceling the display of the extension bar control when the user input is deleted.

12. The computer device according to claim 8, wherein the at least one character string comprises:
   at least one of an input string and a predictive string, the input string being a character string inputted by the input operation, and the predictive string being a character string obtained through word prediction based on the input string.

13. The computer device according to claim 12, wherein the plurality of operations further comprises:
   determining at least one of a first predictive string and a second predictive string according to the input string, the first predictive string being determined in a local word prediction database of the application, and the second predictive string being determined in an online word prediction database by a server.

14. The computer device, according to claim 8, wherein the target function is a first function in the application for processing the target string;
   or
   the target function is a second function in the application, a function name of the second function matching the target string;
   or
   the target function is a third function in another application invoked by the application, a function name of the third function matching the target string.

15. A non-transitory computer-readable storage medium, storing at least one program that, when executed by a processor of a computer device, causes the computer device to implement a method of displaying information in a program interface of an application, the method including:
   displaying a virtual keyboard control and a search box control in the program interface;
   in response to an input operation in the search box control, displaying, in a first region of the program interface, one or more contacts matching user input associated with the input operation; and
   displaying at least one character string in an extension bar control next to the virtual keyboard control, the at least one character string including the user input and at least one extra character being determined according to the user input in the virtual keyboard control and the extension bar control is distinct from the search box control; and
   in response to a select operation on a target string among the at least one character string in the extension bar control, displaying a function interface of applying a target function to the target string.

16. The non-transitory computer-readable storage medium according to claim 15, wherein the at least one character string comprises:
   at least one of an input string and a predictive string, the input string being a character string inputted by the input operation, and the predictive string being a character string obtained through word prediction based on the input string.

17. The non-transitory computer-readable storage medium according to claim 16, wherein the method implemented by the computer device further includes:
   determining at least one of a first predictive string and a second predictive string according to the input string, the first predictive string being determined in a local word prediction database of the application, and the second predictive string being determined in an online word prediction database by a server.

18. The non-transitory computer-readable storage medium according to claim 15, wherein
   the target function is a first function in the application for processing the target string;
   or
   the target function is a second function in the application, a function name of the second function matching the target string;
   or
   the target function is a third function in another application invoked by the application, a function name of the third function matching the target string.

* * * * *